US011659274B2

(12) United States Patent
Shigeta

(10) Patent No.: US 11,659,274 B2
(45) Date of Patent: May 23, 2023

(54) LENS APPARATUS, IMAGE PICKUP APPARATUS, PROCESSING APPARATUS, PROCESSING METHOD, AND COMPUTER-READABLE STORAGE MEDIUM

(71) Applicant: CANON KABUSHIKI KAISHA, Tokyo (JP)

(72) Inventor: Junji Shigeta, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/181,589

(22) Filed: Feb. 22, 2021

(65) Prior Publication Data

US 2021/0274087 A1    Sep. 2, 2021

(30) Foreign Application Priority Data

Feb. 28, 2020    (JP) .............................. JP2020-033351

(51) Int. Cl.
*H04N 5/232*    (2006.01)

(52) U.S. Cl.
CPC ..... *H04N 5/23209* (2013.01); *H04N 5/23222* (2013.01); *H04N 5/232125* (2018.08)

(58) Field of Classification Search
CPC ......... H04N 5/23222; H04N 5/232125; H04N 5/23209; H04N 5/23219; H04N 5/23212; H04N 13/0007; G06K 9/3241
USPC ...... 348/208.11, 208.7, 208.4, 208.2, 208.99
See application file for complete search history.

(56) References Cited

U.S. PATENT DOCUMENTS

2018/0184064 A1*  6/2018  Cheng .............. H04N 5/232123
2022/0076018 A1*  3/2022  Geiss ..................... G06V 40/16

FOREIGN PATENT DOCUMENTS

JP           2007006305 A       1/2007

* cited by examiner

*Primary Examiner* — Xi Wang
(74) *Attorney, Agent, or Firm* — Canon U.S.A., Inc. IP Division

(57) ABSTRACT

A lens apparatus includes an optical member, a driving device configured to perform driving of the optical member, a detector configured to detect a state related to the driving, and a processor configured to generate a control signal for the driving device based on first information about the detected state, wherein the processor includes a machine learning model configured to generate an output related to the control signal based on the first information and second information about the lens apparatus, and is configured to output the first information and the second information to a generator configured to perform generation of the machine learning model.

19 Claims, 16 Drawing Sheets

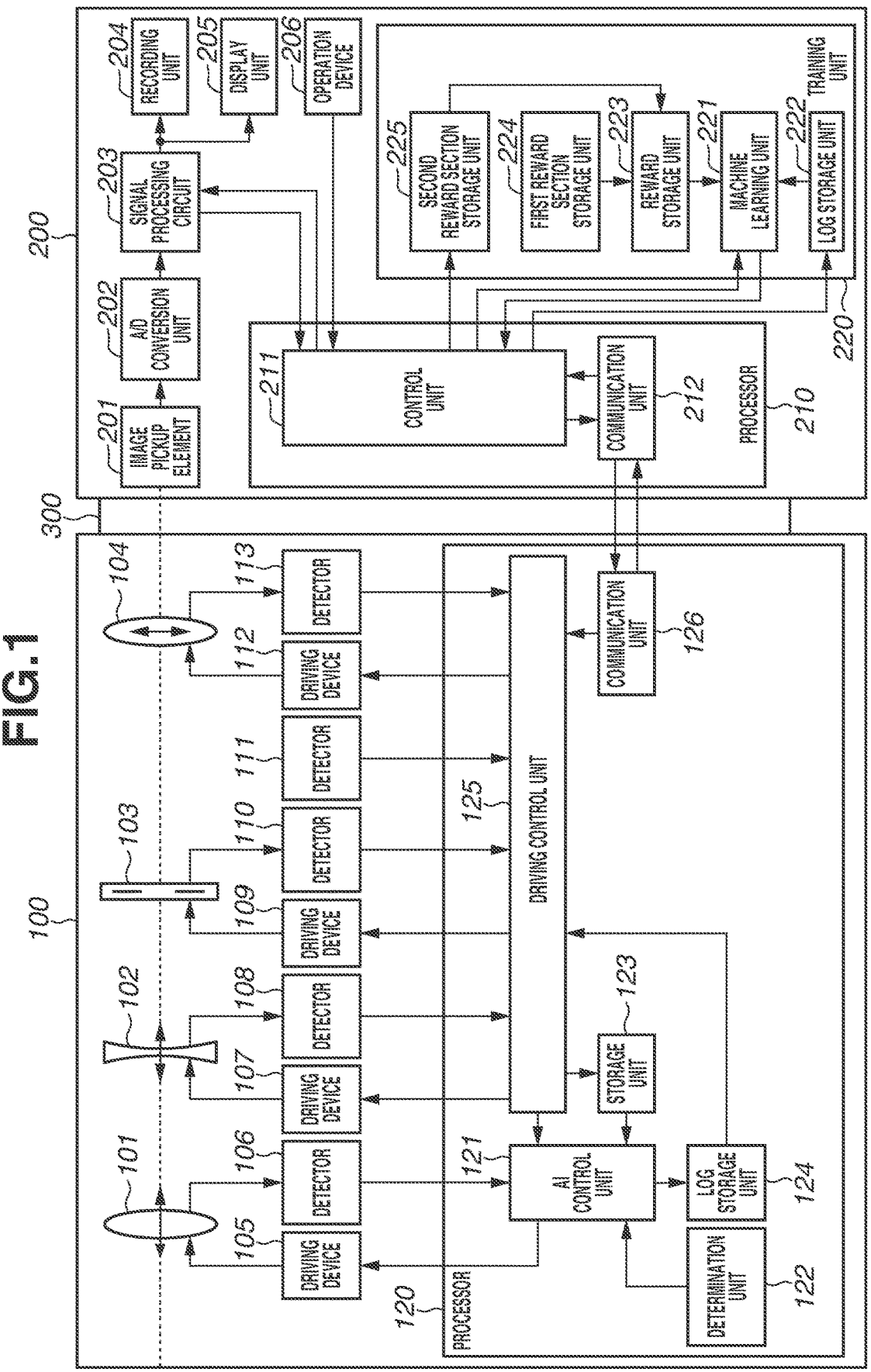

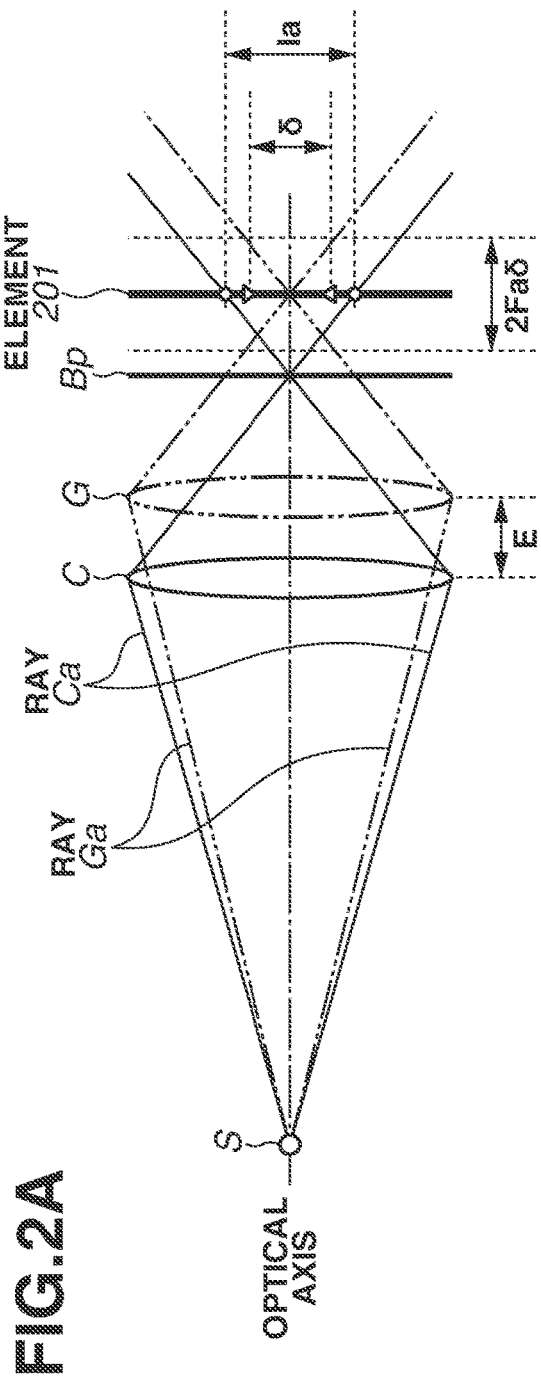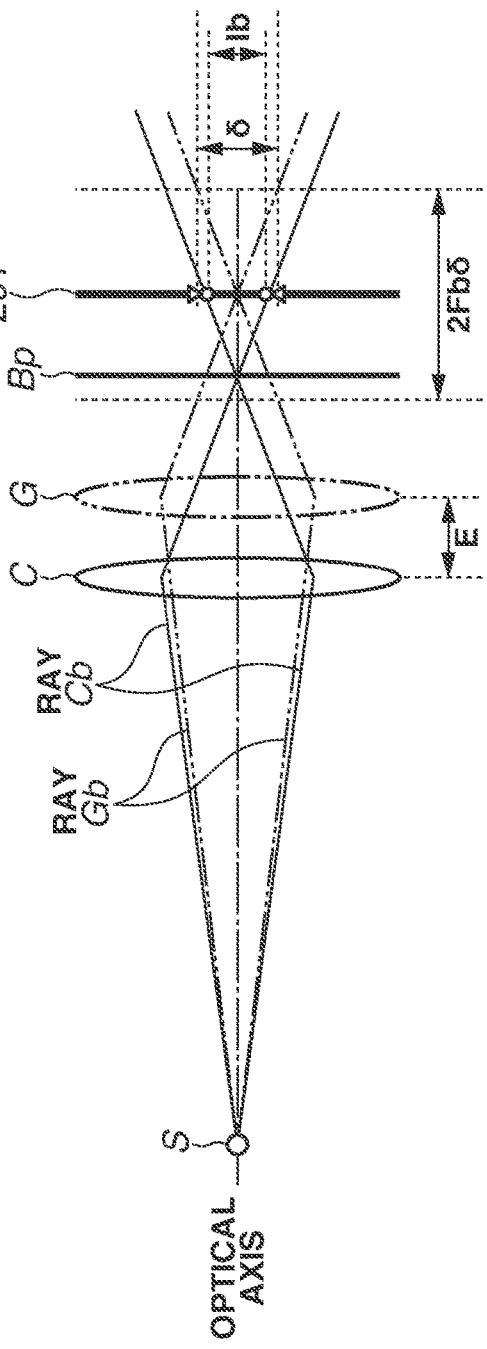
FIG.2A
FIG.2B

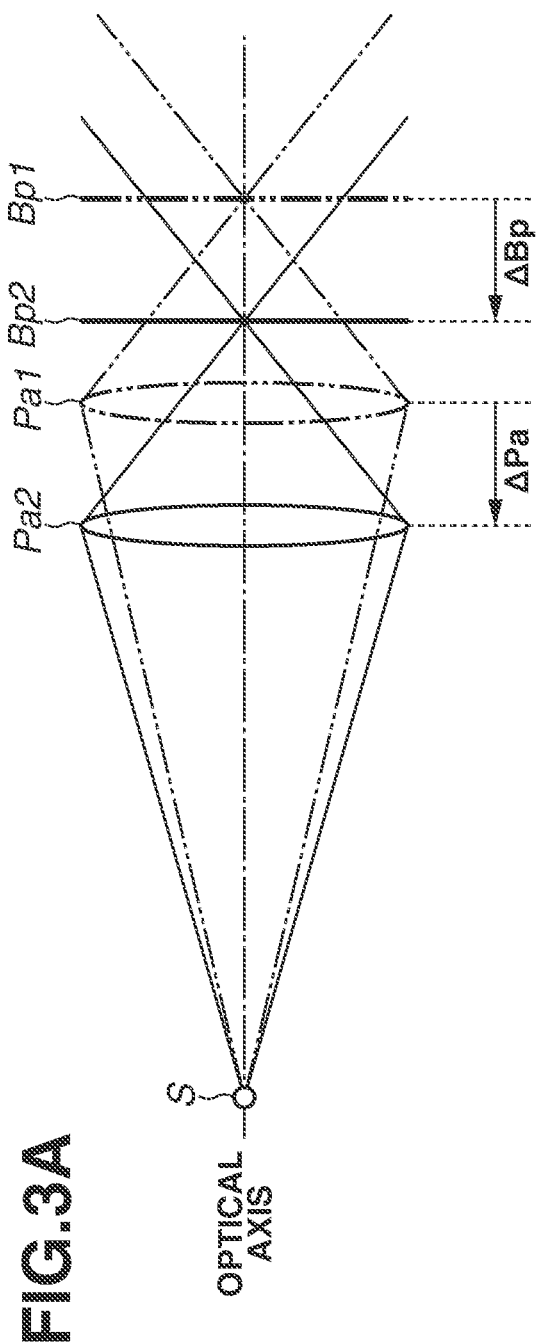
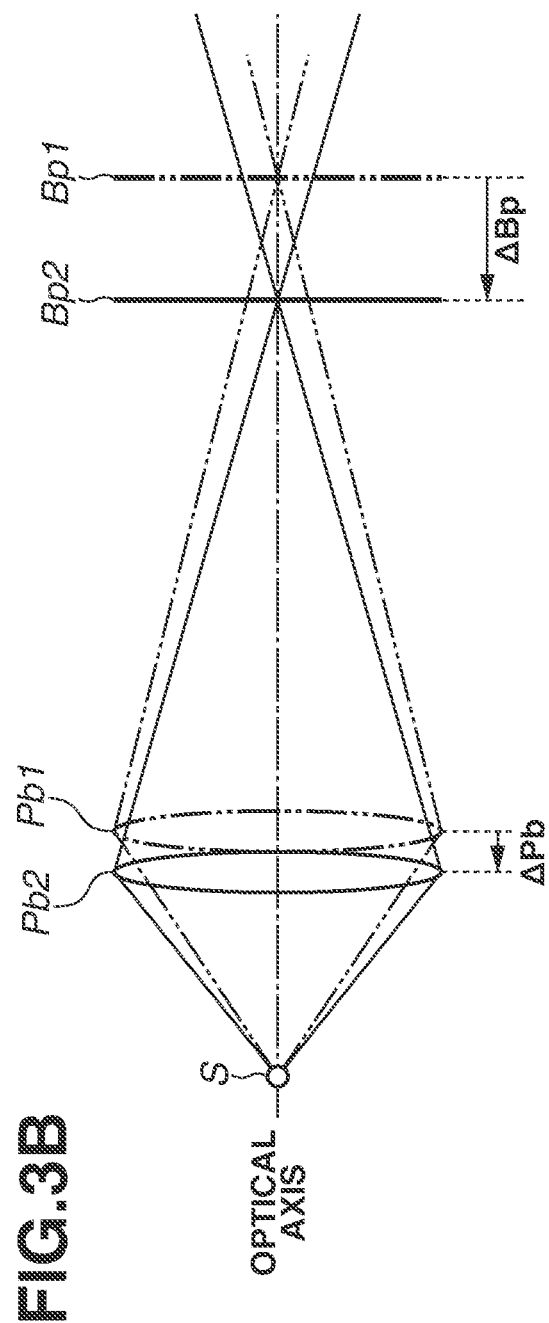

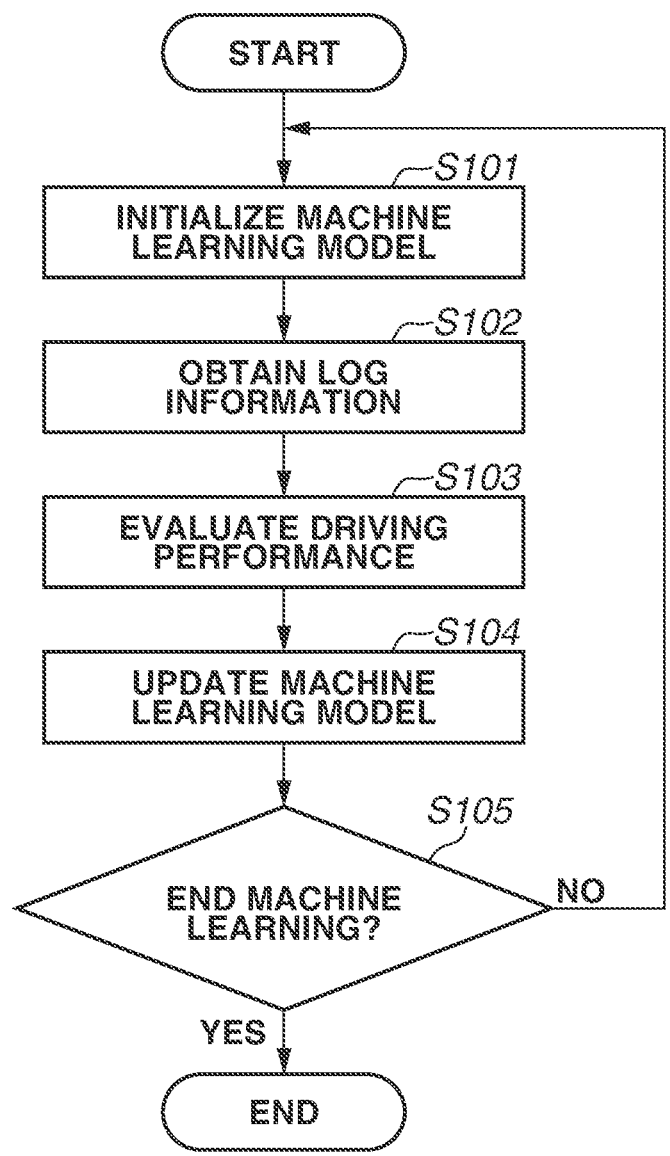

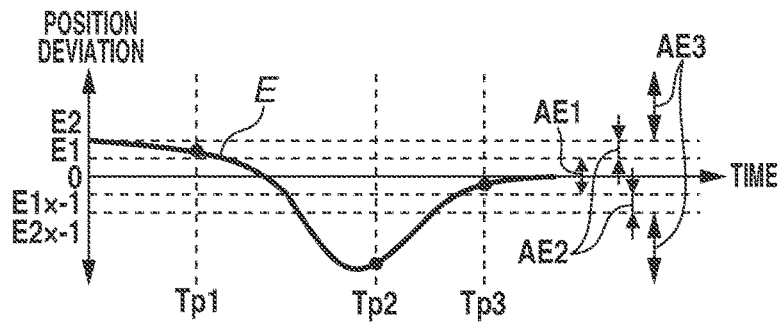
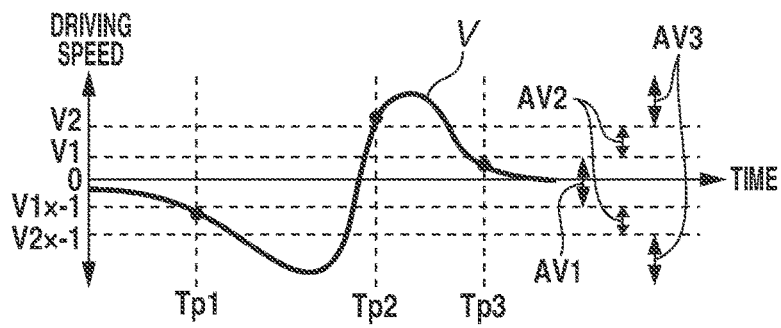
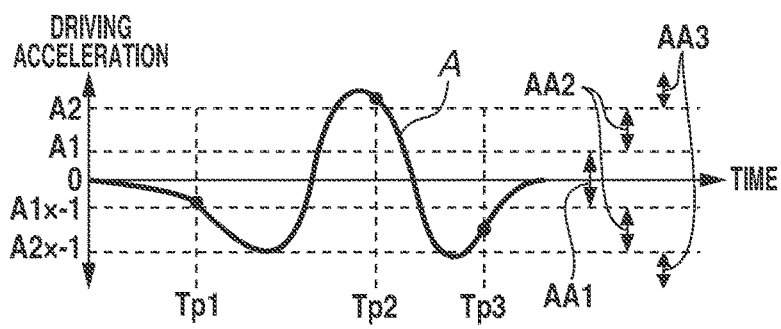
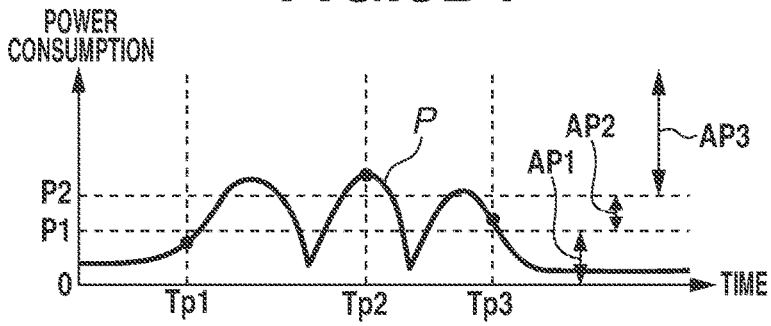

FIG.9

| | REWARD | | | | | |
|---|---|---|---|---|---|---|
| | FIRST REWARD SECTION | | | SECOND REWARD SECTION | | |
| POSITION DEVIATION | REWARD REb RELATED TO POSITIONING ACCURACY | | | REWARD REu RELATED TO POSITIONING ACCURACY | | |
| | BOUNDARY VALUE | REWARD | | BOUNDARY VALUE | REWARD | |
| | Eb1 \| Eb2 | SEb1 \| SEb2 \| SEb3 | | Eu1 \| Eu2 | SEu1 \| SEu2 \| SEu3 | |
| DRIVING SPEED | REWARD RVb RELATED TO DRIVING SPEED | | | REWARD RVu RELATED TO DRIVING SPEED | | |
| | BOUNDARY VALUE | REWARD | | BOUNDARY VALUE | REWARD | |
| | Vb1 \| Vb2 | SVb1 \| SVb2 \| SVb3 | | Vu1 \| Vu2 | SVu1 \| SVu2 \| SVu3 | |
| DRIVING ACCELERATION | REWARD RAb RELATED TO DRIVING ACCELERATION | | | REWARD RAu RELATED TO DRIVING ACCELERATION | | |
| | BOUNDARY VALUE | REWARD | | BOUNDARY VALUE | REWARD | |
| | Ab1 \| Ab2 | SAb1 \| SAb2 \| SAb3 | | Au1 \| Au2 | SAu1 \| SAu2 \| SAu3 | |
| POWER CONSUMPTION | REWARD RPb RELATED TO POWER CONSUMPTION | | | REWARD RPu RELATED TO POWER CONSUMPTION | | |
| | BOUNDARY VALUE | REWARD | | BOUNDARY VALUE | REWARD | |
| | Pb1 \| Pb2 | SPb1 \| SPb2 \| SPb3 | | Pu1 \| Pu2 | SPu1 \| SPu2 \| SPu3 | |

FIG.10A

| | OPTION UREu FOR SECOND REWARD SECTION RELATED TO POSITIONING ACCURACY |||||
|---|---|---|---|---|---|
| | BOUNDARY VALUE || REWARD |||
| | Eu1 | Eu2 | SEu1 | SEu2 | SEu3 |
| LEVEL 1 | Eu1L1 | Eu2L1 | SEu1L1 | SEu2L1 | SEu3L1 |
| LEVEL 2 | Eu1L2 | Eu2L2 | SEu1L2 | SEu2L2 | SEu3L2 |
| LEVEL 3 | Eu1L3 | Eu2L3 | SEu1L3 | SEu2L3 | SEu3L3 |

FIG.10B

| | OPTION URSu FOR SECOND REWARD SECTION RELATED TO QUIETNESS |||||||||
|---|---|---|---|---|---|---|---|---|---|
| | OPTION URVu FOR SECOND REWARD SECTION RELATED TO DRIVING SPEED |||||OPTION URAu FOR SECOND REWARD SECTION RELATED TO DRIVING ACCELERATION ||||
| | BOUNDARY VALUE || REWARD ||| BOUNDARY VALUE || REWARD |||
| | Vu1 | Vu2 | SVu1 | SVu2 | SVu3 | Au1 | Au2 | SAu1 | SAu2 | SAu3 |
| LEVEL 1 | Vu1L1 | Vu2L1 | SVu1L1 | SVu2L1 | SVu3L1 | Au1L1 | Au2L1 | SAu1L1 | SAu2L1 | SAu3L1 |
| LEVEL 2 | Vu1L2 | Vu2L2 | SVu1L2 | SVu2L2 | SVu3L2 | Au1L2 | Au2L2 | SAu1L2 | SAu2L2 | SAu3L2 |
| LEVEL 3 | Vu1L3 | Vu2L3 | SVu1L3 | SVu2L3 | SVu3L3 | Au1L3 | Au2L3 | SAu1L3 | SAu2L3 | SAu3L3 |

FIG.10C

| | OPTION URPu FOR SECOND REWARD SECTION RELATED TO POWER CONSUMPTION |||||
|---|---|---|---|---|---|
| | BOUNDARY VALUE || REWARD |||
| | Pu1 | Pu2 | SPu1 | SPu2 | SPu3 |
| LEVEL 1 | Pu1L1 | Pu2L1 | SPu1L1 | SPu2L1 | SPu3L1 |
| LEVEL 2 | Pu1L2 | Pu2L2 | SPu1L2 | SPu2L2 | SPu3L2 |
| LEVEL 3 | Pu1L3 | Pu2L3 | SPu1L3 | SPu2L3 | SPu3L3 |

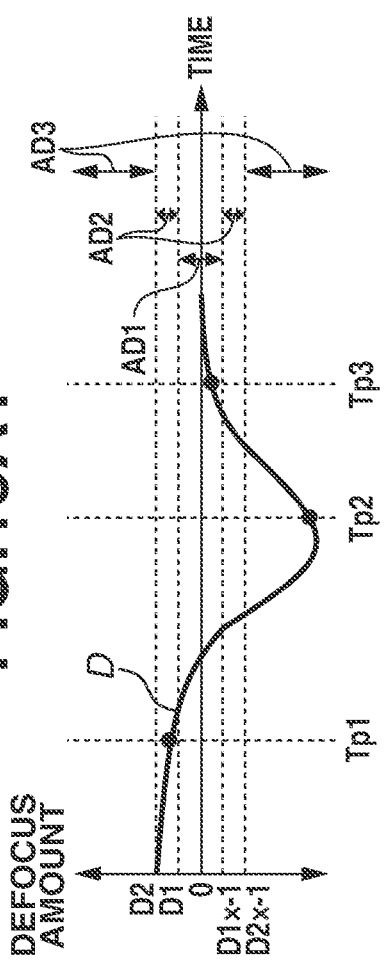
FIG. 13A1
FIG. 13A2
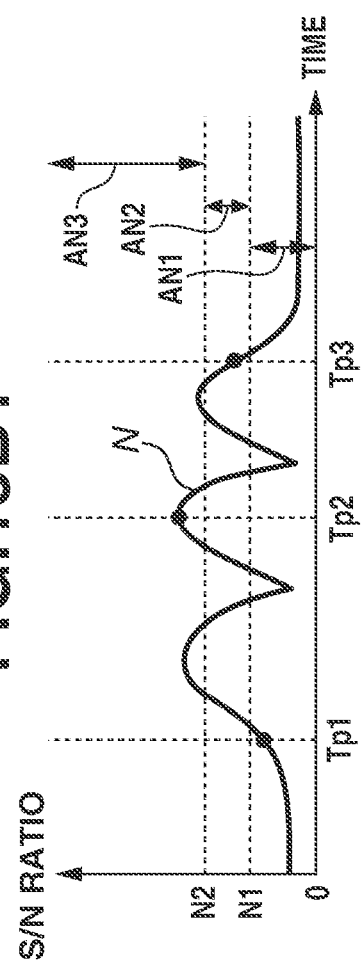
FIG. 13B1
FIG. 13B2

FIG.14

| | REWARD | | | | | |
|---|---|---|---|---|---|---|
| | FIRST REWARD SECTION | | | SECOND REWARD SECTION | | |
| DEFOCUS AMOUNT | REWARD RDb RELATED TO DEFOCUS AMOUNT | | | REWARD RDu RELATED TO DEFOCUS AMOUNT | | |
| | BOUNDARY VALUE | REWARD | | BOUNDARY VALUE | REWARD | |
| | Db1 \| Db2 | SDb1 \| SDb2 \| SDb3 | | Du1 \| Du2 | SDu1 \| SDu2 \| SDu3 | |
| S/N RATIO (QUIETNESS) | REWARD RNb RELATED TO S/N RATIO | | | REWARD RNu RELATED TO S/N RATIO | | |
| | BOUNDARY VALUE | REWARD | | BOUNDARY VALUE | REWARD | |
| | Nb1 \| Nb2 | SNb1 \| SNb2 \| SNb3 | | Nu1 \| Nu2 | SNu1 \| SNu2 \| SNu3 | |

FIG.15A

| | OPTION URDu FOR SECOND REWARD SECTION RELATED TO DEFOCUS AMOUNT | | | | |
|---|---|---|---|---|---|
| | BOUNDARY VALUE | | REWARD | | |
| | Du1 | Du2 | SDu1 | SDu2 | SDu3 |
| LEVEL 1 | Du1L1 | Du2L1 | SDu1L1 | SDu2L1 | SDu3L1 |
| LEVEL 2 | Du1L2 | Du2L2 | SDu1L2 | SDu2L2 | SDu3L2 |
| LEVEL 3 | Du1L3 | Du2L3 | SDu1L3 | SDu2L3 | SDu3L3 |

FIG.15B

| | OPTION URNu FOR SECOND REWARD SECTION RELATED TO S/N RATIO | | | | |
|---|---|---|---|---|---|
| | BOUNDARY VALUE | | REWARD | | |
| | Nu1 | Nu2 | SNu1 | SNu2 | SNu3 |
| LEVEL 1 | Nu1L1 | Nu2L1 | SNu1L1 | SNu2L1 | SNu3L1 |
| LEVEL 2 | Nu1L2 | Nu2L2 | SNu1L2 | SNu2L2 | SNu3L2 |
| LEVEL 3 | Nu1L3 | Nu2L3 | SNu1L3 | SNu2L3 | SNu3L3 |

# LENS APPARATUS, IMAGE PICKUP APPARATUS, PROCESSING APPARATUS, PROCESSING METHOD, AND COMPUTER-READABLE STORAGE MEDIUM

BACKGROUND OF THE DISCLOSURE

Field of the Disclosure

The aspect of the embodiments relates to a lens apparatus, an image pickup apparatus, a processing apparatus, a processing method, and a computer-readable storage medium.

Description of the Related Art

Some recent digital cameras can capture not only still images but also moving images. For quick still-image capturing capability, high-speed automatic focusing, zooming, and aperture operations are required. By contrast, in capturing a moving image, high operation noise from a driving system for the high-speed operations can impair the quality of the sound recorded along with the image. In view of this, Japanese Patent Application Laid-Open No. 2007-006305 discusses an image pickup apparatus that switches an operation mode of its actuators to a silent mode during moving image capturing.

A wide variety of types of performance are required of the actuators for driving the optical members of an image pickup apparatus. Examples include performance about driving speed related to control followability, positioning accuracy related to accurate imaging condition settings, power consumption related to continuous image-pickup duration, and quietness related to the quality of sound during moving image capturing. These types of performance are mutually dependent. For example, the image pickup apparatus discussed in Japanese Patent Application Laid-Open No. 2007-006305 improves quietness by limiting driving speed and acceleration.

Desirable quietness can vary depending on the imaging situation. Desirable driving speed and acceleration can also vary depending on the imaging situation. The same applies to other types of performance such as the positioning accuracy and the power consumption. Moreover, priorities of the respective types of performance can vary depending on the imaging situation and the operator. Thus, the actuators are desirably operated with driving performance suitable for various imaging situations and operators.

SUMMARY OF THE DISCLOSURE

According to an aspect of the embodiments, a lens apparatus includes an optical member, a driving device configured to perform driving of the optical member, a detector configured to detect a state related to the driving, and a processor configured to generate a control signal for the driving device based on first information about the detected state, wherein the processor includes a machine learning model configured to generate an output related to the control signal based on the first information and second information about the lens apparatus, and is configured to output the first information and the second information to a generator configured to perform generation of the machine learning model.

Further features of the disclosure will become apparent from the following description of exemplary embodiments with reference to the attached drawings.

BRIEF DESCRIPTION OF THE DRAWINGS

FIG. 1 is a diagram illustrating a configuration example of a lens apparatus according to a first exemplary embodiment.

FIGS. 2A and 2B are diagrams illustrating positioning accuracy serving as driving performance.

FIGS. 3A and 3B are diagrams illustrating driving speed serving as driving performance.

FIG. 7 is a flowchart illustrating a processing procedure of machine learning.

FIGS. 8A1, 8A2, 8B1, 8B2, 8C1, 8C2, 8D1 and 8D2 are diagrams illustrating reward information.

FIG. 9 is a diagram illustrating a data structure of reward information.

FIGS. 10A to 10C are diagrams illustrating data structures of information about options for a second reward section.

FIGS. 13A1, 13A2, 13B1 and 13B2 are diagrams illustrating reward information.

FIG. 14 is a diagram illustrating a data structure of reward information.

FIGS. 15A and 15B are diagrams illustrating data structures of information about options for a second reward section.

DESCRIPTION OF THE EMBODIMENTS

Figure 4A:
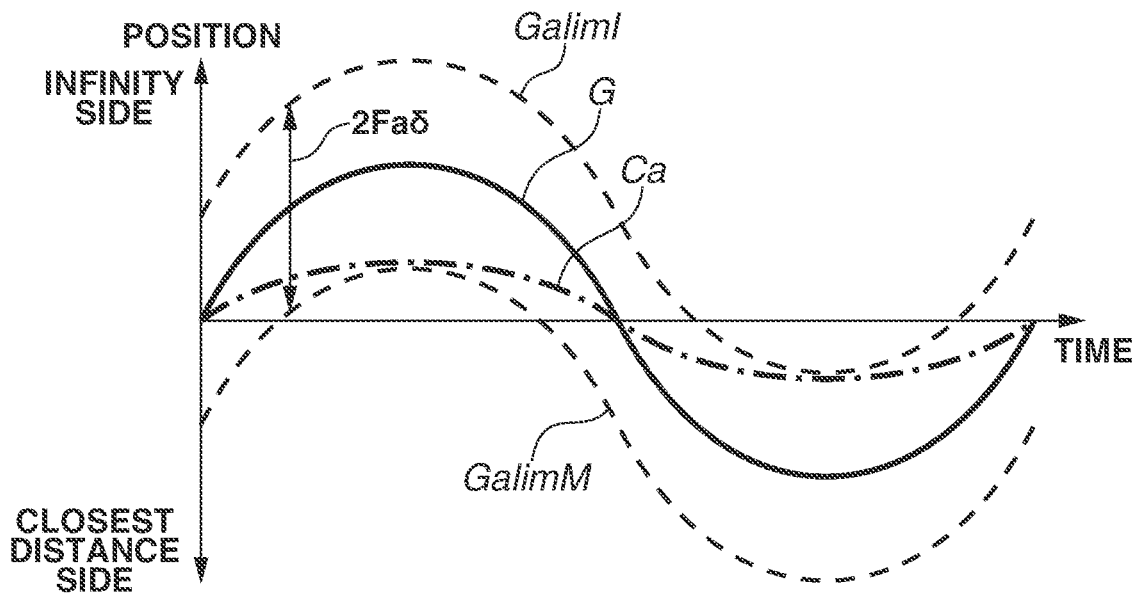
FIGS. 4A and 4B are diagrams illustrating a relationship of the positioning accuracy with the driving speed, power consumption, and quietness.

Exemplary embodiments of the disclosure will be described below with reference to the attached drawings. Throughout the drawings for describing the exemplary embodiments, similar members are denoted by the same reference numerals in principle (unless otherwise specified). A redundant description thereof will be omitted.

First Exemplary Embodiment

«Configuration Example Where Camera Main Body (Processing Apparatus) Includes Training Unit (Generator)»

FIG. 1 is a diagram illustrating a configuration example of a lens apparatus according to a first exemplary embodiment, and by extension, a diagram illustrating a configuration example of a system (image pickup apparatus) including a configuration example of a camera main body (also referred to as a camera apparatus main body, an image pickup apparatus main body, or a processing apparatus) as well. The system includes a camera main body 200 and a lens apparatus 100 (also referred to as an interchangeable lens) mounted on the camera main body 200. The camera main body 200 and the lens apparatus 100 are mechanically and electrically connected via a mount 300 serving as a coupling mechanism. The mount 300 may be composed of a mount unit belonging to the camera main body 200 and a mount unit belonging to the lens apparatus 100, or may be configured to include both of the mounting units. The camera main body 200 can supply power to the lens apparatus 100 via a power supply terminal included in the mount 300. The camera main body 200 and the lens apparatus 100 can communicate with each other via a communication terminal included in the mount 300. In the present exemplary embodiment, the lens apparatus 100 and the camera main body 200 are configured to be connected via the mount 300. However, the lens apparatus 100 and the camera main body 200 may be integrally configured without a mount.

The lens apparatus 100 can include a focus lens unit 101 for changing an object distance, a zoom lens unit 102 for changing a focal length, an aperture stop 103 for adjusting an amount of light, and an image stabilization lens unit 104 intended for image stabilization. The focus lens unit 101 and the zoom lens unit 102 are held by respective holding frames. The holding frames are configured to be movable in the direction of an optical axis (the direction of the broken line in the diagram) via guide shafts, for example. The focus lens unit 101 is driven along the direction of the optical axis by a driving device 105. A detector 106 detects the position of the focus lens unit 101. The zoom lens unit 102 is driven along the direction of the optical axis by a driving device 107. A detector 108 detects the position of the zoom lens unit 102. The aperture stop 103 includes diaphragm blades. The diaphragm blades are driven by a driving device 109 to adjust the amount of light. A detector 110 detects an opening amount (also referred to as a degree of opening or f-number) of the aperture stop 103. The image stabilization lens unit 104 is driven by a driving device 112 in directions including components orthogonal to the optical axis, whereby image shakes due to camera shakes are reduced. A detector 113 detects the position of the image stabilization lens unit 104. The driving devices 105, 107, 109, and 112 can be configured to include an ultrasonic motor, for example. The driving devices 105, 107, 109, and 112 are not limited to ultrasonic motors, and may be configured to include other motors such as a voice coil motor, a direct-current (DC) motor, and a stepping motor.

The detectors 106, 108, 110, and 113 can be configured to include a potentiometer or an encoder, for example. If a driving device includes a motor capable of driving by a given driving amount without feedback of the driving amount (control amount), such as a stepping motor, then a detector for detecting a specific position (a reference position or a point of origin) may be provided. In such a case, the detector can include a photo-interrupter, for example. A detector 111 detects shakes of the lens apparatus 100. The detector 111 can include a gyroscope, for example.

A processor 120 can be a microcomputer, and can include an artificial intelligence (AI) control unit 121, a determination unit 122, a storage unit 123, a log storage unit 124, a driving control unit 125, and a communication unit 126. The AI control unit 121 is a control unit that controls driving of the focus lens unit 101. The AI control unit 121 here can operate based on a neural network (NN) algorithm. In more common terms, the AI control unit 121 generates a driving instruction for the driving device 105 of the focus lens unit 101 by using a machine learning model. The determination unit 122 is a determination unit that determines information about the lens apparatus 100 (second information) for the AI control unit 121 to use. The storage unit 123 is a storage unit that stores information for identifying the type of input (feature amount) to the NN, and information about weights assigned to inputs to respective layers. The log storage unit 124 stores information about an operation log of the lens apparatus 100 concerning the driving control on the focus lens unit 101. The driving control unit 125 controls driving of the zoom lens unit 102, the aperture stop 103, and the image stabilization lens unit 104. For example, the driving control unit 125 can generate a driving instruction for the driving devices 107, 109, and 112 by proportional-integral-derivative (PID) control based on deviations between target positions or target speeds of objects to be controlled and the actual positions or actual speeds of the objects to be controlled. The communication unit 126 is a communication unit for communicating with the camera main body 200. The NN algorithm, the weights, the second information, and the operation log will be described below.

The camera main body 200 (processing apparatus) can include an image pickup element 201, an analog-to-digital (A/D) conversion unit 202, a signal processing circuit 203, a recording unit 204, a display unit 205, an operation device 206, a processor 210 (also referred to as a camera microcomputer), and a training unit 220. The image pickup element 201 picks up an image formed by the lens apparatus 100. For example, the image pickup element 201 can include a charge-coupled device (CCD) image sensor or a complementary metal-oxide-semiconductor (CMOS) device. The A/D conversion unit 202 converts an analog signal (image signal) captured and output by the image pickup element 201 into a digital signal. The signal processing circuit 203 converts the digital signal output from the A/D conversion unit 202 into image data. The recording unit 204 records the image data output from the signal processing circuit 203. The display unit 205 displays the image data output from the signal processing circuit 203. The operation device 206 is intended for an operator (user) to operate the image pickup apparatus.

The processor 210 is intended to control the camera main body 200, and can include a control unit 211 and a communication unit 212. The control unit 211 generates a driving instruction for the lens apparatus 100 based on the image data from the signal processing circuit 203 and the operator's input information from the operation device 206. The control unit 211 also gives an instruction and transmits information to the training unit 220 (to be described below). The communication unit 212 communicates with the lens apparatus 100. The communication unit 212 transmits the driving instruction from the control unit 211 to the lens apparatus 100 as a control command. The communication unit 212 also receives information from the lens apparatus 100.

The training unit 220 (generator) can include a processor (such as a central processing unit (CPU) and a graphics processing unit (GPU)) and a storage device (such as a read-only memory (ROM), a random access memory (RAM), and a hard disk drive (HDD)). The training unit 220 can include a machine learning unit 221, a reward storage unit 223, a first reward section storage unit 224, a second reward section storage unit 225, and a log storage unit 222. The training unit 220 also stores a program for controlling operation of the units 221 to 225. Reward information stored in the reward storage unit 223, information about a first reward section stored in the first reward section storage unit 224, information about a second reward section stored in the second reward section storage unit 225, and information for obtaining the information about the second reward section from information input by the operator will be described below.

<Recording and Display of Image Data>

The recording and display of image data by the image pickup apparatus illustrated in FIG. 1 will now be described.

Light entering the lens apparatus 100 forms an image on the image pickup element 201 via the focus lens unit 101, the zoom lens unit 102, the aperture stop 103, and the image stabilization lens unit 104. The image pickup element 201 converts the image into an electrical analog signal. The A/D conversion unit 202 converts the analog signal into a digital signal. The signal processing circuit 203 converts the digital signal into image data. The image data output from the signal processing circuit 203 is recorded in the recording unit 204. The image data is also displayed on the display unit 205.

<Focus Control>

Next, focus control of the lens apparatus 100 by the camera main body 200 will be described. The control unit 211 performs automatic focus (AF) control based on the image data output from the signal processing circuit 203. For example, the control unit 211 performs AF control to drive the focus lens unit 101 so that the contrast of the image data is maximized. The control unit 211 outputs a driving amount of the focus lens unit 101 to the communication unit 212 as a driving instruction. The communication unit 212 receives the driving instruction from the control unit 211, converts the driving instruction into a control command, and transmits the control command to the lens apparatus 100 via communication contact members of the mount 300. The communication unit 126 receives the control command from the communication unit 212, converts the control command into a driving instruction, and outputs the driving instruction to the AI control unit 121 via the driving control unit 125. As the driving instruction is input, the AI control unit 121 generates a driving signal based on a machine learning model (trained weights) stored in the storage unit 123, and outputs the driving signal to the driving device 105. Details of generation of the driving signal by the AI control unit 121 will be described below. In such a manner, the focus lens unit 101 is driven based on the driving instruction from the control unit 211 of the camera main body 200. Thus, the control unit 211 can perform the AF control to drive the focus lens unit 101 so that the contrast of the image data is maximized.

<Aperture Stop Control>

Next, aperture stop control of the lens apparatus 100 by the camera main body 200 will be described. The control unit 211 performs aperture stop control (exposure control) based on the image data output from the signal processing circuit 203. Specifically, the control unit 211 determines a target f-number so that the image data has a constant luminance value. The control unit 211 outputs the determined f-number to the communication unit 212 as a driving instruction. The communication unit 212 receives the driving instruction from the control unit 211, converts the driving instruction into a control command, and transmits the control command to the lens apparatus 100 via the communication contact members of the mount 300. The communication unit 126 receives the control command from the communication unit 212, converts the control command into a driving instruction, and outputs the driving instruction to the driving control unit 125. As the driving instruction is input, the driving control unit 125 determines a driving signal based on the driving instruction and the f-number of the aperture stop 103 detected by the detector 110, and outputs the driving signal to the driving device 109. In such a manner, the aperture stop 103 is driven to make the luminance value of the image data constant based on the driving instruction from the control unit 211 of the camera main body 200. Thus, the control unit 211 can perform exposure control to drive the aperture stop 103 so that the exposure amount of the image pickup element 201 is appropriate.

<Description of Zoom Control>

Next, zoom control of the lens apparatus 100 by the camera main body 200 will be described. The operator performs a zoom operation on the lens apparatus 100 via the operation device 206. The control unit 211 outputs the driving amount of the zoom lens unit 102 to the communication unit 212 as a driving instruction based on an amount of the zoom operation output from the operation device 206. The communication unit 212 receives the driving instruction, converts the driving instruction into a control command, and transmits the control command to the lens apparatus 100 via the communication contact members of the mount 300. The communication unit 126 receives the control command from the communication unit 212, converts the control command into a driving instruction, and outputs the driving instruction to the driving control unit 125. As the driving instruction is input, the driving control unit 125 generates a driving signal based on the driving instruction and the position of the zoom lens unit 102 detected by the detector 108, and outputs the driving signal to the driving device 107. In such a manner, the zoom lens unit 102 is driven based on the driving instruction from the control unit 211 of the camera main body 200. Thus, the control unit 211 can perform zoom control to drive the zoom lens unit 102 based on the amount of the zoom operation output from the operation device 206.

<Image Stabilization Control>

Next, image stabilization control of the lens apparatus 100 will be described. The driving control unit 125 determines a target position of the image stabilization lens unit 104 to reduce image shakes due to vibrations of the lens apparatus 100 based on a signal indicating the vibrations of the lens apparatus 100, output from the detector 111. The driving control unit 125 generates a driving signal based on the target position and the position of the image stabilization lens unit 104 detected by the detector 113, and outputs the driving signal to the driving device 112. In such a manner, the image stabilization lens unit 104 is driven based on the driving signal from the driving control unit 125. Thus, the driving control unit 125 can perform image stabilization control to reduce image shakes due to vibrations of the lens apparatus 100.

<Driving Performance Related to Focus Control>

Four types of driving performance related to focus control, namely, positioning accuracy, driving speed, power consumption, and quietness will be described. These types of driving performance are adapted to various situations where focus control is performed.

(1) Positioning Accuracy

The positioning accuracy will be described with reference to FIGS. 2A and 2B. FIGS. 2A and 2B are diagrams illustrating the positioning accuracy serving as driving performance. FIGS. 2A and 2B illustrate cases where the depth of focus is small and where the depth of focus is large, respectively. In FIGS. 2A and 2B, the f-numbers are different. A target position G of the focus lens unit 101 represents the position of the focus lens unit 101 where a point-like object S on the optical axis is in focus on the image pickup element 201. A position C represents the actual position of the focus lens unit 101 after the focus lens unit 101 is driven to the target position G. The position C is on an object S side of the target position G by a control error (control deviation) E. An image forming position (focal point position) Bp represents the position where the image of the object S is formed when the focus lens unit 101 is located at the position C. The image pickup element 201 has a permissible circle of confusion (diameter) δ.

The f-number (Fa) in FIG. 2A is smaller (brighter) than the f-number (Fb) in FIG. 2B. Thus, the depth of focus (2Faδ) in FIG. 2A is smaller than the depth of focus (2Fbδ) in FIG. 2B. Rays Ca and rays Ga in FIG. 2A represent the outermost rays from the object S when the focus lens unit 101 is located at the position C and the target position G, respectively. Rays Cb and rays Gb in FIG. 2B represent the outermost rays from the object S when the focus lens unit 101 is located at the position C and the target position G, respectively. In FIG. 2A, the point image of the object S on the image pickup element 201 when the focus lens unit 101 is located at the position C has a diameter Ia. In FIG. 2B, the point image of the object S on the image pickup element 201 when the focus lens unit 101 is located at the position C has a diameter Ib.

In FIG. 2A, the focal point position Bp falls outside the depth of focus (2Faδ). The diameter Ia of the point image is greater than the permissible circle of confusion δ, and the point image goes beyond the center pixel of the image pickup element 201 and spreads to adjoining pixels. Thus, in FIG. 2A, with the focus lens unit 101 at the position C, the object S is in an out-of-focus state. By contrast, in FIG. 2B, the focal point position Bp falls within the depth of focus (2Fbδ). The diameter Ib of the point image is smaller than the permissible circle of confusion δ, and the point image lies within the center pixel of the image pickup element 201. Thus, in FIG. 2B, with the focus lens unit 101 at the point C, the object S is in an in-focus state. Thus, given the same positioning accuracy of the focus lens unit 101, the in-focus state is either able or not able to be achieved depending on the imaging condition. In other words, a desirable positioning accuracy changes with the imaging condition.

(2) Driving Speed

The driving speed refers to an amount of movement per unit time. A focal point moving speed refers to an amount of movement of the focal point per unit time. An amount of movement of the focus lens unit 101 is proportional to the amount of movement of the focal point. A proportionality constant in this proportional relationship will be referred to as a focus sensitivity. In other words, the focus sensitivity is the amount of movement of the focal point of the lens apparatus 100 per unit amount of movement of the focus lens unit 101. The focus sensitivity varies depending on the state of an optical system constituting the lens apparatus 100. An amount of movement of the focal point ΔBp can be expressed by the following Eq. (1):

$$\Delta Bp = Se \times \Delta P, \quad (1)$$

where Se is the focus sensitivity, and ΔP is the amount of movement of the focus lens unit 101.

The driving speed required for focus control will now be described with reference to FIGS. 3A and 3B. FIGS. 3A and 3B are diagrams illustrating the driving speed serving as driving performance. FIGS. 3A and 3B illustrate cases where the focus sensitivity Se is high and where the focus sensitivity Se is low, respectively. In FIGS. 3A and 3B, the object distances are different. In FIG. 3A, the position of the focus lens unit 101 is moved from position Pa1 to position Pa2 in moving the position of the focal point from position Bp1 to position Bp2. The relationship between the amount of movement ΔPa (ΔP) of the focus lens unit 101 and the amount of movement of the focal point ΔBp here is given by Eq. (1). In FIG. 3B, the position of the focus lens unit 101 is moved from position Pb1 to position Pb2 in moving the position of the focal point from position Bp1 to position Bp2. The relationship between the amount of movement ΔPb (ΔP) of the focus lens unit 101 and the amount of movement of the focal point ΔBp here is given by Eq. (1).

As illustrated in FIGS. 3A and 3B, the amount of movement of the focus lens unit 101 required for moving the same amount of movement of the focal point ΔBp is greater in FIG. 3A than in FIG. 3B, since the focus sensitivity in FIG. 3A is lower than that in FIG. 3B. Thus, the amount of movement of the focus lens unit 101 per unit time can be reduced in the case of FIG. 3B compared to the case of FIG. 3A. In other words, the same moving speed of the focal point can be obtained by reducing the driving speed of the focus lens unit 101. Thus, the driving speed of the focus lens unit 101 to obtain a specific moving speed of the focal point depends on the imaging condition. In other words, the desirable moving speed of the focus lens unit 101 varies depending on the imaging condition.

(3) Power Consumption

The power consumption varies with the driving duration, the driving speed, and the driving acceleration of the focus lens unit 101. Specifically, the power consumption increases in a case where the driving duration is long, the driving speed is high, or the driving acceleration is high compared to a case where it is not. In other words, if the power consumption can be reduced by adaptation of the driving performance, imaging duration per single charging operation of a battery can be increased or the battery can be miniaturized, for example, since a battery capacity can be effectively used.

(4) Quietness

The driving of the focus lens unit 101 produces driving noise due to vibrations and friction. The driving noise varies with the driving speed and the driving acceleration of the focus lens unit 101. Specifically, the driving noise increases in a case where the driving speed is high or the driving acceleration is high, compared to a case where it is not. The longer the focus lens unit 101 remains at rest, the more beneficial the focus control can be in terms of quietness. Unpleasant driving noise can be recorded during imaging in a quiet place. Thus, a capability of changing the driving noise depending on an imaging environment (ambient sound level) may be required.

<Relationship of Positioning Accuracy with Driving Speed, Power Consumption, and Quietness>

Figure 4B:
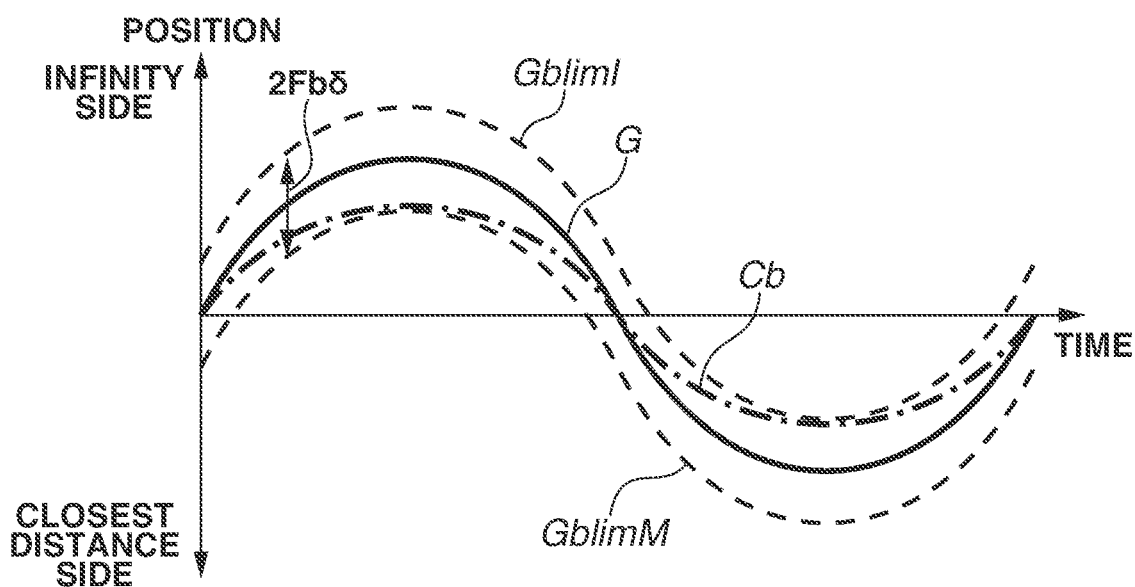

A relationship of the positioning accuracy with the driving speed, the power consumption, and the quietness will be described with reference to FIGS. 4A and 4B. FIGS. 4A and 4B are diagrams illustrating the relationship of the positioning accuracy with the driving speed, the power consumption, and the quietness. FIGS. 4A and 4B illustrate the movement of the focus lens unit 101 to continue focusing on a moving object in a case where the depth of focus is large and in a case where the depth of focus is small, respectively. In FIGS. 4A and 4B, the horizontal axis represents time, and the vertical axis represents the position of the focus lens unit 101. The vertical axis indicates a direction toward the infinity upward, and a direction toward the closest distance downward.

The target position G of the focus lens unit 101 represents the position of the focus lens unit 101 when an image of the object is focused on the image pickup element 201. The depths of focus in FIGS. 4A and 4B are 2Faδ and 2Fbδ, respectively. In FIG. 4A, a position GalimI indicates the position of the focus lens unit 101 where the focal point is located at the boundary of the depth of focus 2Faδ on the infinity side, and a position GalimM indicates the position of the focus lens unit 101 where the focal point is located at the boundary of the depth of focus 2Faδ on the closest distance side, with reference to the target position G. In FIG. 4B, a position GblimI indicates the position of the focus lens unit 101 where the focal point is located at the boundary of the depth of focus 2Fbδ on the infinity side, and a position GblimM indicates the position of the focus lens unit 101 where the focal point is located at the boundary of the depth of focus 2Fbδ on the closest distance side, with reference to the target position G. A position (locus) Ca in FIG. 4A and a position (locus) Cb in FIG. 4B indicate the position of the focus lens unit 101 controlled so that the object falls within the depths of focus 2Faδ and 2Fbδ, respectively.

In FIG. 4A, the depth of focus 2Faδ is large, and the object is less likely to go out of focus due to the control of the focus lens unit 101. By contrast, in FIG. 4B, the depth of focus 2Fbδ is small, and the locus Cb of the focus lens unit 101 is to be controlled to make the deviation from the target position G smaller than that in FIG. 4A. More specifically, while the object is maintained in focus both in FIGS. 4A and 4B, the driving along the locus Ca in FIG. 4A can reduce the driving amount and the driving speed compared to the driving along the locus Cb in FIG. 4B. In other words, under an imaging condition where the positioning accuracy is low, the focus lens unit 101 can be controlled with low speed, low power consumption, and low noise.

<Relationship of Driving Speed with Positioning Accuracy, Power Consumption, and Quietness>

Figure 5A:
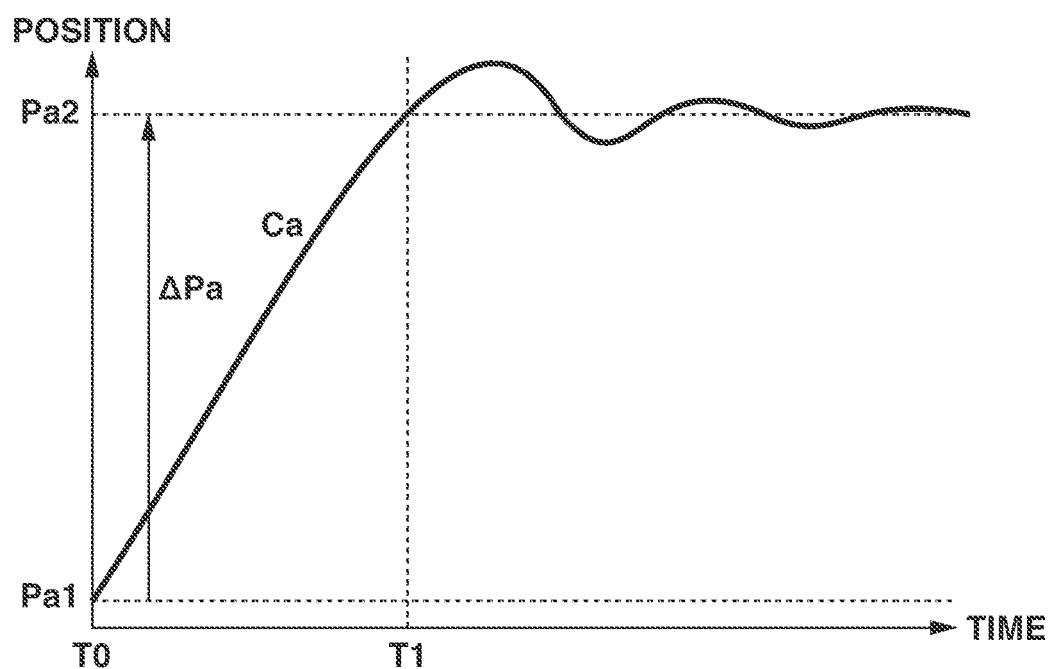
FIGS. 5A and 5B are diagrams illustrating a relationship of the driving speed with the positioning accuracy, the power consumption, and the quietness.
Figure 5B:
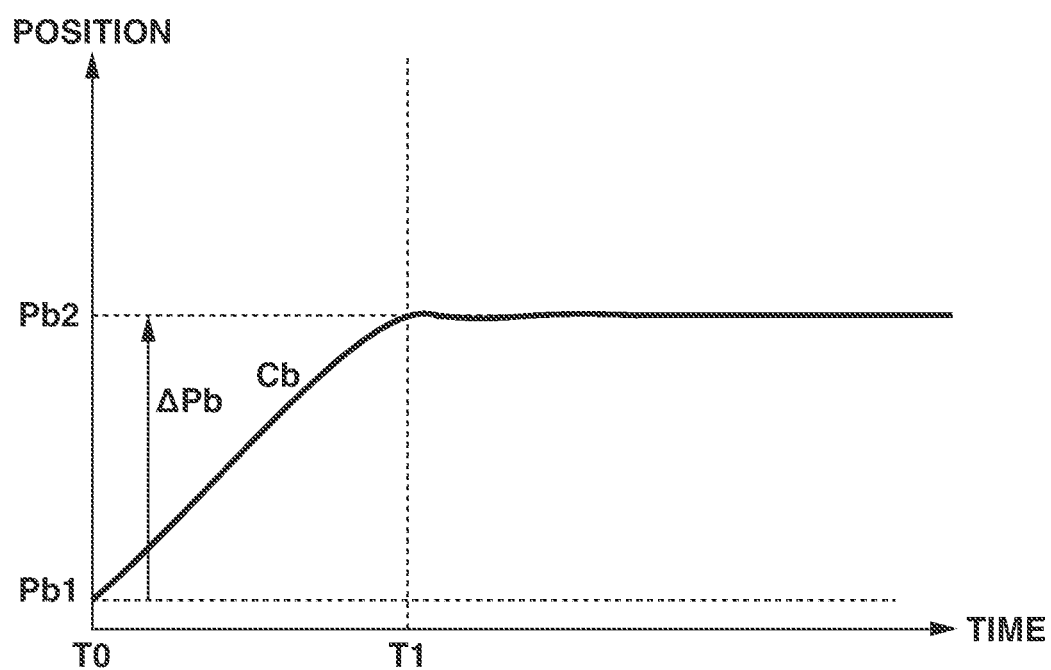

A relationship of the driving speed with the positioning accuracy, the power consumption, and the quietness will be described with reference to FIGS. 5A and 5B. FIGS. 5A and 5B are diagrams illustrating the relationship of the driving speed with the positioning accuracy, the power consumption, and the quietness. In FIGS. 5A and 5B, the horizontal axis represents time, and the vertical axis represents the position of the focus lens unit 101. FIG. 5A illustrates the position Ca of the focus lens unit 101 in a case where the focus lens unit 101 is driven from the position Pa1 to the position Pa2 illustrated in FIG. 3A in time T0 to T1. FIG. 5B illustrates the position Cb of the focus lens unit 101 in a case where the focus lens unit 101 is driven from the position Pb1 to the position Pb2 illustrated in FIG. 3B in time T0 to T1. As illustrated in FIGS. 3A and 3B, the amount of movement of the focal point in the case where the focus lens unit 101 is moved from the position Pa1 to the position Pa2 is the same as the amount of movement of the focal point in the case where the focus lens unit 101 is moved from the position Pb1 to the position Pb2. Gradients of the positions Ca and Cb in FIGS. 5A and 5B correspond to the driving speeds of the focus lens unit 101.

As illustrated in FIGS. 5A and 5B, the driving speed of the focus lens unit 101 to obtain the same amount of movement of the focal point ΔBp in time T0 and T1 is higher in the case of the position Ca than in the case of the position Cb. In addition, since the driving speed corresponding to the position Ca is higher than that corresponding to the position Cb, the position Ca takes a long time to stabilize after the focus lens unit 101 reaches the target position Pa2. By contrast, since the driving speed corresponding to the position Cb is lower than that corresponding to the position Ca, the position Cb takes only a short time to stabilize after the focus lens unit 101 reaches the target position Pb2. In other words, the driving speed affects the positioning accuracy. The driving acceleration of the focus lens unit 101 corresponding to the position Ca is also high, and the power consumption and the driving noise are also high, compared to those corresponding to the position Cb. In other words, under an imaging condition where the required driving speed is low, the focus lens unit 101 can be controlled with high positioning accuracy, low power consumption, and low noise.

<Second Information about Lens Apparatus>

Next, the second information about the lens apparatus 100 will be described. The second information is information influencing the driving performance of the focus lens unit 101. As described above, for the sake of adaptation of the driving performance in the driving control of the focus lens unit 101, the control signal (driving signal) is to be generated based on the second information influencing the driving performance. The second information is determined by the determination unit 122. The second information includes information about the depth of focus and the focus sensitivity, for example. The determination unit 122 obtains the information about the depth of focus from information about the f-number and information about the permissible circle of confusion. The determination unit 122 stores information (table) indicating a relationship of the focus sensitivity with the position of the focus lens unit 101 and the position of the zoom lens unit 102, and obtains the information about the focus sensitivity from the relationship, information about the position of the focus lens unit 101, and information about the position of the zoom lens unit 102. Generating the control signal based on such second information can provide a lens apparatus a benefit in term of the adaptation (customization) of the driving performance such as the positioning accuracy, driving speed, power consumption, and quietness. A machine learning algorithm for generating the control signal based on the second information will be described below.

<Machine Learning Model>

A method for the AI control unit 121 to generate the control signal by using a machine learning model will be described. The AI control unit 121 includes a machine learning model and operates based on a machine learning algorithm. The machine learning algorithm here is, but not limited to, an NN based algorithm (also referred to as an NN algorithm). The AI control unit 121 makes reference to a feature amount to be input to an NN stored in the storage unit 123 and weights assigned to inputs to the respective layers, and generates an output related to the control signal by the NN algorithm using the feature amount and the weights obtained by the reference. A method for generating the machine learning model (weights) will be described below.

Figure 6:
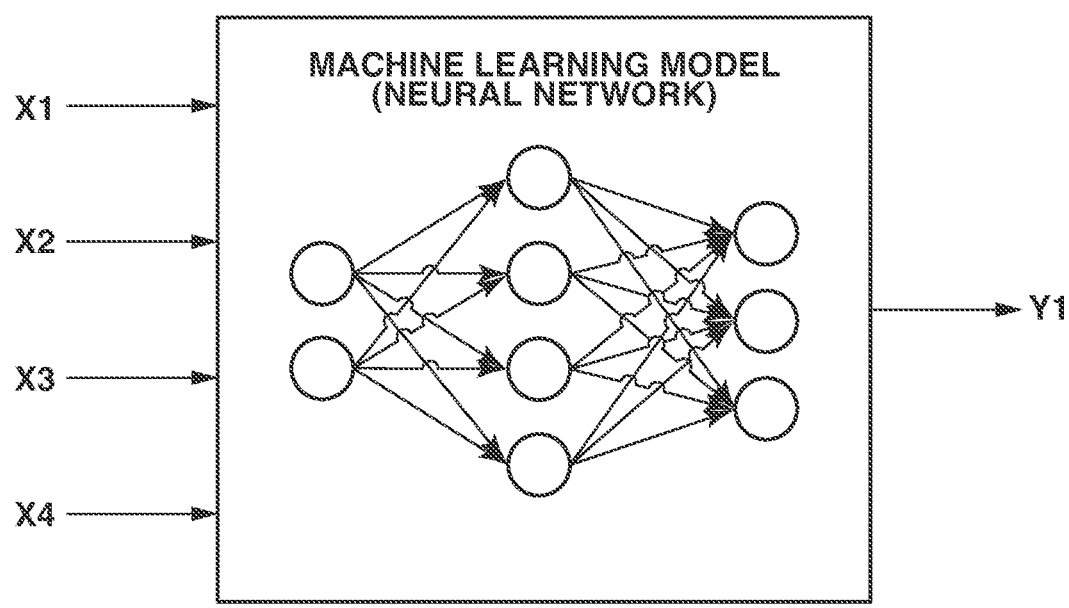
FIG. 6 is a diagram illustrating inputs and an output of a neural network.

A concept representing an input and output structure of the machine learning model according to the first exemplary embodiment will be described with reference to FIG. 6. FIG. 6 is a diagram illustrating inputs and an output of the NN. In FIG. 6, an input X1 is information about the driving instruction output from the driving control unit 125. An input X2 is information about the position of the focus lens unit 101 obtained from the detector 106. An input X3 is information about the depth of focus serving as the second information. An input X4 is information about the focus sensitivity serving as the second information. An output Y1 is information about the output related to the control signal for the driving device 105. Thus, the output Y1 of the trained machine learning model is generated based on the inputs X1 to X4. The AI control unit 121 generates the output Y1 as a control signal or generates a control signal based on the output Y1, and controls the driving device 105 by using the control signal.

<Method for Generating Machine Learning Model (Weights)>

Next, the method for generating the machine learning model (weights) (training by the machine learning unit 221) will be described. The control unit 211 transmits an instruction related to execution of machine learning to the machine learning unit 221 based on the operator's operation on the operation device 206. Receiving the instruction, the machine learning unit 221 starts machine learning. The procedure of the machine learning by the machine learning unit 221 will be described with reference to FIG. 7. FIG. 7 is a flowchart illustrating the processing procedure of the machine learning.

In step S101 of FIG. 7, the machine learning unit 221 initializes the machine learning model (weights). Specifically, the machine learning unit 221 outputs initial values of the weights to the control unit 211. The control unit 211 receives the initial values of the weights from the machine learning unit 221, and transmits the initial values of the weights to the lens apparatus 100 via the communication unit 212. The driving control unit 125 of the lens apparatus 100 receives the initial values of the weights via the communication unit 126, and stores the initial values in the storage unit 123. Subsequently, in step S102, the machine learning unit 221 obtains log information. Specifically, the machine learning unit 221 requests the control unit 211 to obtain log information about the lens apparatus 100. Receiving the request, the control unit 211 requests the log information from the lens apparatus 100 via the communication unit 212. The driving control unit 125 of the lens apparatus 100 receives the request for the log information via the communication unit 126, and instructs the AI control unit 121 to drive the focus lens unit 101. The AI control unit 121 receives the instruction for driving, and generates a control signal for the driving device 105 based on the machine learning model using the weights stored in the storage unit 123. The machine learning unit 221 stores a predetermined training driving pattern for driving the focus lens unit 101 from a start position to a stop position, and generates control signals corresponding to the training driving pattern. A training driving pattern determined based on an autofocus algorithm may be used instead of the predetermined training driving pattern. The driving control unit 125 receives the request for the log information via the communication unit 126, and requests the log storage unit 124 to output the log information. The log storage unit 124 receives the output request, and transmits the log information about the lens apparatus 100 during driving of the focus lens unit 101 to the camera main body 200 via the driving control unit 125 and the communication unit 126. The log information is stored in the log storage unit 222.

In step S103, the machine learning unit 221 evaluates the driving performance of the focus lens unit 101. Specifically, the machine learning unit 221 evaluates the driving performance of the focus lens unit 101 driven by using the control signal generated by the AI control unit 121 based on reward information stored in the reward storage unit 223 and the log information stored in the log storage unit 222. Details of the evaluation will be described below. In step S104, the machine learning unit 221 updates the machine learning model (weights). Specifically, the machine learning unit 221 updates the machine learning model (weights) based on an evaluation value resulting from the evaluation (for example, so that the evaluation value is maximized). The weights can be updated by, but not limited to, backpropagation. The generated weights (machine learning model) are stored in the storage unit 123 by processing similar to the processing of step S101.

In step S105, the machine learning unit 221 determines whether to end the machine learning. Specifically, for example, the machine learning unit 221 makes the determination based on whether the number of times of training (weight update) reaches a predetermined value, or whether the amount of change in the evaluation value of the driving performance is less than a predetermined value. If the machine learning unit 221 determines to not end the machine learning (NO in step S105), the processing returns to step S101, and the machine learning unit 221 continues the machine learning. If the machine learning unit 221 determines to end the machine learning (YES in step S105), the processing ends. The machine learning unit 221 employs a machine learning model of which the evaluation satisfies an acceptance condition (for example, the amount of change in the evaluation value of the driving performance is less than a predetermined value). The machine learning unit 221 does not employ a machine learning model that satisfies an end condition (for example, the number of times of training reaches a predetermined value) and of which the evaluation does not satisfy the acceptance condition.

The machine learning algorithm can be deep learning that uses an NN and generates the weights assigned to the inputs to the layers by itself. Deep learning can even generate feature amounts by itself. The machine learning algorithm is not limited to deep learning, and other algorithms may be used. Examples may include at least one of the following: the nearest neighborhood algorithm, Naïve Bayes algorithm, a decision tree, and a support vector machine. Any of such algorithms available can be applied to the present exemplary embodiment as appropriate.

A GPU can perform parallel data processing with high efficiency, and is thus effective in performing repetitive training using a machine learning model such as one in deep learning. Thus, a GPU can be used for the processing by the machine learning unit 221 instead of or in addition to a CPU. For example, a machine learning program including a machine learning model can be executed by cooperation of a CPU and a GPU.

<Log Information>

Next, the log information will be described. The log information includes information targeted for the evaluation of the driving performance of the focus lens unit 101. The log storage unit 124 collects and stores input/output information about the machine learning model, such as the inputs X1 to X4 and the output Y1 illustrated in FIG. 6, in each operation period of the machine learning model. The log storage unit 124 stores information about the power consumption of the driving device 105 obtained by the processor 120 as the log information. The log storage unit 124 also stores information about the driving instruction input to the AI control unit 121 and the position of the focus lens unit 101 detected by the detector 106 as the log information. The log storage unit 124 also stores information about the target position and the positioning accuracy of the focus lens unit 101 obtained by the processor 120 as the log information. The log storage unit 124 also stores information about the driving speed and the driving acceleration of the focus lens unit 101 obtained from the information about the position of the focus lens unit 101 as the log information. The log storage unit 124 transmits the stored log information to the camera main body 200 via the driving control unit 125 and the communication unit 126. The control unit 211 of the camera main body 200 receives the log information via the communication unit 212, and stores the log information in the log storage unit 222.

<Reward Information and Evaluation of Driving Performance>

The reward information is information for evaluating the driving performance. The reward information includes information about boundary values for determining ranges and information about rewards determined for the respective ranges in advance for each of the types of driving performance. The reward information will be described with reference to FIGS. 8A1 to 8D2. FIGS. 8A1 to 8D2 are diagrams illustrating examples of the reward information. FIGS. 8A1, 8B1, 8C1, and 8D1 illustrate a relationship between time and a reward in training a machine learning model for the positioning accuracy, the driving speed, the driving acceleration, and the power consumption serving as the driving performance, respectively. The horizontal axes of the graphs represent time. The vertical axes of the graphs represent the driving performance and the boundary values. FIGS. 8A2, 8B2, 8C2, and 8D2 illustrate data structures of the reward information about the positioning accuracy, the driving speed, the driving acceleration, and the power consumption, respectively. The data structures include data on the boundary values and data on the rewards in the respective ranges.

The machine learning model is trained so that the evaluation of the driving performance improves. Thus, for example, if the intended driving performance is the positioning accuracy, the highest reward is assigned to the range including a position deviation of 0. A specific type of driving performance is assigned relatively high rewards and thereby given priority over another type of driving performance. For example, the power consumption is assigned relatively high rewards and thereby given priority over the positioning accuracy. In the present exemplary embodiment, the reward information will be described to include information with two boundary values and information with three rewards.

The vertical axis of FIG. 8A1 indicates the value of a position deviation E that is the difference between the target position and the actual position of the focus lens unit 101. The positive direction of the position deviation E corresponds to a case where the actual position of the focus lens unit 101 is on the infinity side of the target position. The negative direction of the position deviation E corresponds to a case where the actual position is on the closest distance side of the target position. The higher the frequency that the position deviation E is close to 0 (the smaller the total sum of position deviations E) is, the higher the positioning accuracy of the focus lens unit 101 is. FIG. 8A2 illustrates reward information RE about the positioning accuracy. The reward information RE includes a boundary value E1 and a boundary value E2 of the position deviation E, and a reward SE1, a reward SE2, and a reward SE3 obtainable in respective ranges. A range where the position deviation E is E1×−1 to E1 will be referred to as a range AE1. A range obtained by excluding the range AE1 from a range where the position deviation E is E2×−1 to E2 will be referred to as a range AE2. A range obtained by excluding the ranges AE1 and AE2 from the entire range will be referred to as a range AE3. As illustrated in FIG. 8A2, the ranges AE1, AE2, and AE3 are assigned the rewards SE1, SE2, and SE3, respectively. The relationship in magnitude between the rewards is the reward SE1>the reward SE2>the reward SE3. The closer to 0 the position deviation E is, the higher reward is assigned. As illustrated in FIG. 8A1, position deviations E at times Tp1, Tp2, and Tp3 belong to the ranges AE2, AE3, and AE1, respectively. Thus, the rewards obtainable at the times Tp1, Tp2, and Tp3 are the rewards SE2, SE3, and SE1, respectively. Here, the boundary value E1 can have a value of $F\delta/2$, and the boundary value E2 can have a value of $F\delta$, for example. In other words, the highest reward SE1 is obtained if the actual position of the focus lens unit 101 has a deviation less than or equal to one half of the depth of focus from the target position ($|E| \leq F\delta/2$). If the actual position of the focus lens unit 101 has a deviation greater than one half of the depth of focus and up to the depth of focus from the target position ($F\delta/2 < |E| \leq F\delta$), the intermediate reward SE2 is obtained. If the actual position of the focus lens unit 101 has a deviation beyond the depth of focus from the target position ($|E| > F\delta$), the lowest reward SE3 is obtained.

The vertical axis of FIG. 8B1 indicates the value of a driving speed V of the focus lens unit 101. The positive direction of the driving speed V represents the direction toward the infinity. The negative direction of the driving speed V represents the direction toward the closest distance. The closer to 0 the driving speed V is, the lower the driving noise is. FIG. 8B2 illustrates reward information RV about the driving speed V. The reward information RV includes boundary values V1 and V2 of the driving speed V, and rewards SV1, SV2, and SV3 obtainable in respective ranges. A range where the driving speed V is V1×−1 to V1 will be referred to as a range AV1. A range obtained by excluding the range AV1 from a range where the driving speed V is V2×−1 to V2 will be referred to as a range AV2. A range obtained by excluding the ranges AV1 and AV2 from the entire range will be referred to as a range AV3. As illustrated in FIG. 8B2, the ranges AV1, AV2, and AV3 are assigned the rewards SV1, SV2, and SV3, respectively. The relationship in magnitude between the rewards is the reward SV1>the reward SV2>the reward SV3. The closer to 0 the driving speed V is, the higher reward is assigned. As illustrated in FIG. 8B1, driving speeds V at times Tp1, Tp2, and Tp3 belong to the ranges AV2, AV3, and AV1, respectively. Thus, the rewards obtainable at the times Tp1, Tp2, and Tp3 are the rewards SV2, SV3, and SV1, respectively. Here, the boundary values V1 and V2 are set based on the relationship between the driving speed V and the driving noise, for example. By setting the rewards so that the obtainable reward increases as the driving speed V decreases, a machine learning model taking into account quietness can be obtained since the driving noise decreases as the driving speed V decreases.

The vertical axis of FIG. 8C1 indicates the value of a driving acceleration A of the focus lens unit 101. The positive direction of the driving acceleration A represents the direction toward the infinity. The negative direction of the driving acceleration A represents the direction toward the closest distance. The closer to 0 the driving acceleration A is, the lower the driving noise is. FIG. 8C2 illustrates reward information RA about the driving acceleration A. The reward information RA includes boundary values A1 and A2 of the driving acceleration A, and rewards SA1, SA2, and SA3 obtainable in respective ranges. A range where the driving acceleration A is A1×−1 to A1 will be referred to as a range AA1. A range obtained by excluding the range AA1 from a range of A2×−1 to A2 will be referred to as a range AA2. A range obtained by excluding the ranges AA1 and AA2 from the entire range will be referred to as a range AA3. As illustrated in FIG. 8C2, the ranges AA1, AA2, and AA3 are assigned the rewards SA1, SA2, and SA3, respectively. The relationship in magnitude between the rewards is the reward SA1>the reward SA2>the reward SA3. The closer to 0 the driving acceleration A is, the higher reward is assigned. As illustrated in FIG. 8C1, driving accelerations A at times Tp1, Tp2, and Tp3 belong to the ranges AA1, AA3, and AA2, respectively. Thus, the rewards obtainable at the times Tp1, Tp2, and Tp3 are the rewards SA1, SA3, and SA2, respectively. Here, the boundary values A1 and A2 are set based on the relationship between the driving acceleration A and the driving noise, for example. By setting the rewards so that the obtainable reward increases as the driving acceleration A decreases, a machine learning model taking into account quietness can be obtained since the driving noise decreases as the driving acceleration A decreases.

The vertical axis of FIG. 8D1 indicates the value of power consumption P of the driving device 105. FIG. 8D2 illustrates reward information RP about the power consumption P. The reward information RP includes boundary values P1 and P2 of the power consumption P, and rewards SP1, SP2 and SP3 obtainable in respective ranges. A range where the power consumption P is 0 to P1 will be referred to as a range AP1. A range where the power consumption P is higher than P1 and not higher than P2 will be referred to as a range AP2. A range obtained by excluding the ranges AP1 and AP2 from the entire range will be referred to as a range AP3. As illustrated in FIG. 8D2, the ranges AP1, AP2, and AP3 are assigned the rewards SP1, SP2, and SP3, respectively. The relationship in magnitude between the rewards is the reward SP1>the reward SP2>the reward SP3. The closer to 0 the power consumption P is, the higher reward is assigned. As illustrated in FIG. 8D1, power consumptions P at times Tp1, Tp2, and Tp3 belong to the ranges AP1, AP3, and AP2, respectively. Thus, the rewards obtainable at the times Tp1, Tp2 and Tp3 are the rewards SP1, SP3, and SP2, respectively. By setting the rewards so that the obtainable reward increases as the power consumption decreases, a machine learning model taking into account low power consumption can be obtained.

In such a manner, the reward information for evaluating the driving performance such as the positioning accuracy (position deviation), the driving speed, the driving acceleration, and the power consumption can be set. Using the reward information, the machine learning unit 221 can generate rewards for the respective types of driving performance in each unit time based on the log information in driving the focus lens unit 101, and accumulate the rewards to evaluate the machine learning model. Being based on the rewards related to a plurality of types of driving performance is beneficial in customizing the machine learning model. The power consumption may be measured based on the current flowing through the driving device 105, or estimated based on the driving speed and/or the driving acceleration. The boundary values are not limited to constant ones and can be changed as appropriate. The rewards are not limited to ones determined based on the boundary values, and may be determined based on functions related to the respective types of driving performance. In such a case, the reward information can include information about the functions.

<First Reward Section and Second Reward Section>

Next, a first reward section and a second reward section of the reward information will be described. FIG. 9 is a diagram illustrating a data structure of the reward information. Information about the first reward section (first reward information prepared in advance) includes information about a reward REb related to the positioning accuracy, a reward RVb related to the driving speed, a reward RAb related to the driving acceleration, and a reward RPb related to the power consumption. Information about the second reward section (second reward information) includes information about a reward REu related to the positioning accuracy, a reward RVu related to the driving speed, a reward RAu related to the driving acceleration, and a reward RPu related to the power consumption. The rewards REb and REu have a data structure similar to that of the reward information RE about the positioning accuracy illustrated in FIG. 8A2. The rewards RVb and RVu have a data structure similar to that of the reward information RV about the driving speed illustrated in FIG. 8B2. The rewards RAb and RAu have a data structure similar to that of the reward information RA about the driving acceleration illustrated in FIG. 8C2. The rewards RPb and RPu have a data structure similar to that of the reward information RP about the power consumption illustrated in FIG. 8D2.

The information about the first reward section is information about rewards specific to the lens apparatus 100. The information about the first reward section is stored in the first reward section storage unit 224 in advance as reward information specific to the lens apparatus 100. The information about the second reward section is information about rewards that are variable based on a request from the operator of the lens apparatus 100. The information about the second reward section is stored in the second reward section storage unit 225 based on the operator's request. The reward storage unit 223 stores the information about the first reward section and the information about the second reward section.

The information about the first reward section is reward information for obtaining allowable driving performance of the lens apparatus 100, and thus includes wider ranges of reward settings including negative values than the information about the second reward section does. The information about the second reward section is variable based on the operator's request, and can be obtained based on information about the request and information about options for the second reward section. The reward information is obtained from the information about the first reward section and the information about the second reward section. A machine learning model is trained (generated) by obtaining the evaluation value of the machine learning model based on the reward information as described with reference to FIGS. 8A1 to 8D2.

A method for obtaining the information about the second reward section based on the operator's request will now be described. FIGS. 10A to 10C are diagrams illustrating a data structure of the information about the options for the second reward section. FIG. 10A illustrates a data structure of information about an option UREu for the second reward section related to the positioning accuracy. The information about the option UREu includes boundary values of the position deviation and reward information about respective ranges defined by the boundary values at each level. FIG. 10B illustrates a data structure of information about an option URSu for the second reward section related to the quietness. The information about the option URSu includes information about an option URVu for the second reward section related to the driving speed and information about an option URAu for the second reward section related to the driving acceleration. The information about the option URVu includes boundary values of the driving speed and reward information about respective ranges defined by the boundary values at each level. The information about the option URAu includes boundary values of the driving acceleration and reward information about respective ranges defined by the boundary values at each level. FIG. 10C illustrates a data structure of information about an option URPu for the second reward section related to the power consumption. The information about the options URPu includes boundary values of the power consumption and reward information about respective ranges defined by the boundary values at each level.

The information about the option UREu for the second reward section related to the positioning accuracy, the information about the option URSu for the second reward section related to the quietness, and the information about the option URPu for the second reward section related to the power consumption are set in the following manner. In each of these types of information, the boundary values and reward values are set so that the operator's request level decreases in order (ascending order) of levels 1, 2, and 3. More specifically, for example, the boundary values at level 1 are close to the target value of the driving performance and the reward values are high, compared to those at the other levels.

The operator's request can be input via the operation device 206 illustrated in FIG. 1. Based on the request, the level of each type of driving performance can be selected from levels 1 to 3. Information about the level is transmitted to the second reward section storage unit 225 via the control unit 211. The second reward section storage unit 225 identifies (selects) information about the second reward section related to each type of driving performance based on the information about the level of each type of driving performance. Thus, a customized machine learning model (weights) can be generated by training the machine learning model (weights) based on the customized information about the rewards. The information about the generated machine learning model (weights) is transmitted from the camera main body 200 to the lens apparatus 100, stored in the storage unit 123, and used to control the driving (driving device 105) of the focus lens unit 101.

Other Examples of Object to be Controlled

While the driving control is described to be targeted for the focus lens unit 101, the present exemplary embodiment is not limited thereto. In the present exemplary embodiment, the driving control may be targeted for other optical members such as the zoom lens unit 102, the image stabilization lens unit 104, a flange back adjustment lens unit, and the aperture stop 103. Positioning accuracy, quietness, and power consumption are the driving performance also to be taken into account in driving such optical members. The required positioning accuracy of the zoom lens unit 102 can vary depending on the relationship between the driving amount and the amount of change in the angle of view or the size of the object. The required positioning accuracy of the image stabilization lens unit 104 can vary with the focal length. The required positioning accuracy of the aperture stop 103 can vary depending on the relationship between the driving amount and the amount of change in the luminance of the video image.

Other Examples of Second Information

The information about the focus sensitivity and the depth of focus has been described to be the second information about the lens apparatus 100. However, this is not restrictive, and the second information may include information about at least one of the orientation, temperature, and ambient sound level of the lens apparatus 100. Depending on the orientation of the lens apparatus 100, the effect of the gravity on the optical members is changed, whereby the load (torque) of the driving device 105 can be changed. Depending on the temperature of the lens apparatus 100, the property of a lubricant in the driving system is changed, whereby the load (torque) of the driving device 105 can be changed. The sound level around the lens apparatus 100 influences the constraints on the driving noise of the driving device 105, whereby the limitations on the speed and acceleration of the driving device 105 can be changed.

As described above, in the present exemplary embodiment, for example, a lens apparatus or an image pickup apparatus beneficial in terms of adaptation (customization) of the driving performance can be provided.

Second Exemplary Embodiment

«Configuration Example Where Lens Apparatus Includes Training Unit (Generator)»

Figure 11:
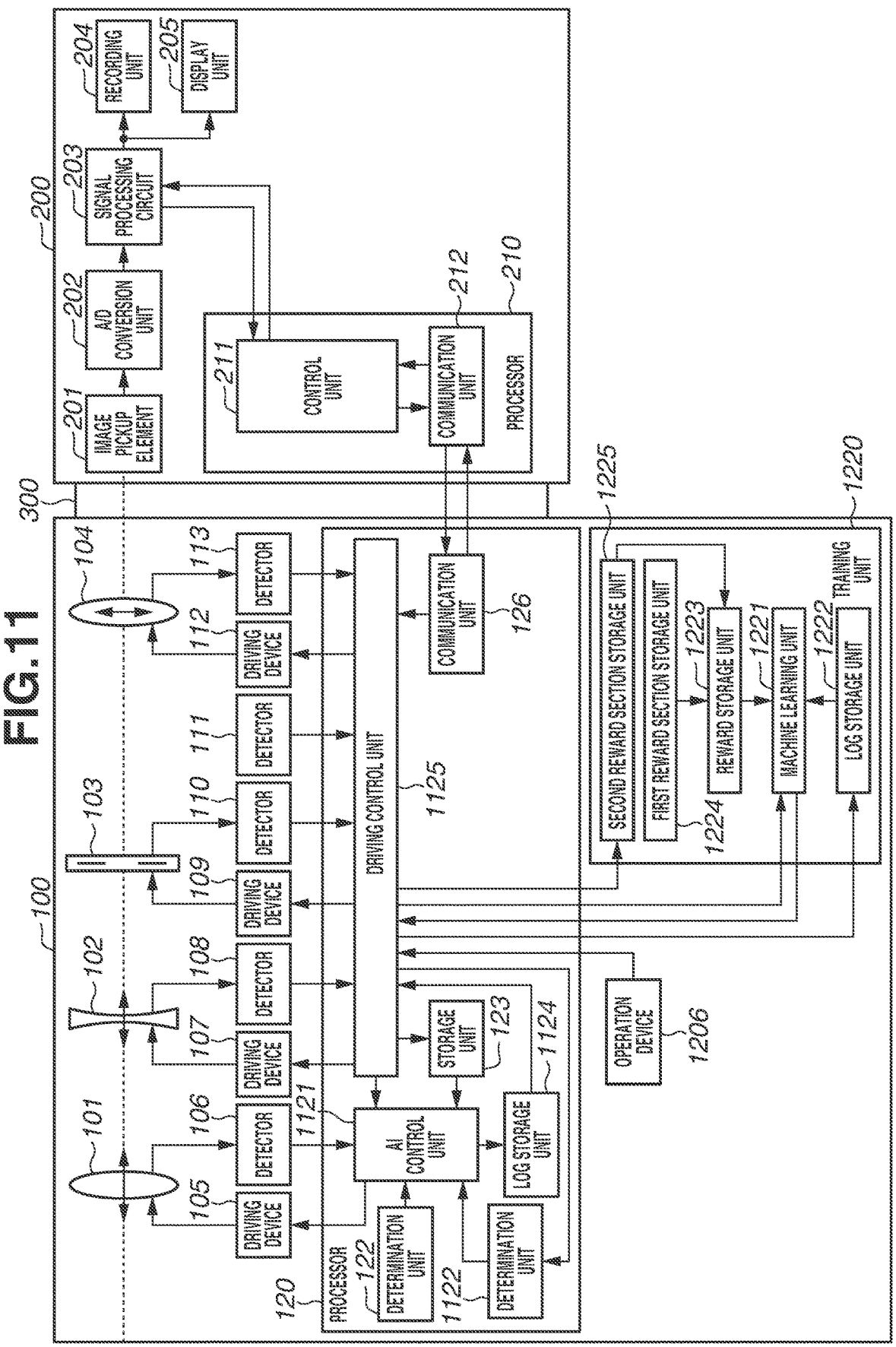
FIG. 11 is a diagram illustrating a configuration example of a lens apparatus according to a second exemplary embodiment.

A second exemplary embodiment will be described with reference to FIGS. 11 to 15B. FIG. 11 is a diagram illustrating a configuration example of a lens apparatus according to the second exemplary embodiment, and by extension, is a diagram illustrating a configuration example of a system (image pickup apparatus) including a configuration example of a camera main body as well. The system is different from that of the first exemplary embodiment in that a lens apparatus 100 includes a training unit. Another difference from the first exemplary embodiment is that second information about the lens apparatus 100 includes information about recording by the camera main body.

A training unit 1220 can include a processor (such as a CPU or a GPU) and a storage device (such as a ROM, RAM, or HDD). The training unit 1220 can include a machine learning unit 1221, a log storage unit 1222, a reward storage unit 1223, a first reward section storage unit 1224, and a second reward section storage unit 1225. The training unit 1220 also stores a program for controlling operation of these units.

A driving control unit 1125 has a function of exchanging information with the training unit 1220 in addition to the functions of the driving control unit 125 according to the first exemplary embodiment. An AI control unit 1121 controls driving (driving device 105) of a focus lens unit 101 based on a machine learning model generated by the training unit 1220. A determination unit 1122 is a determination unit that determines information (second information) about the lens apparatus 100 for the AI control unit 1121 to use. The second information will be described below. An operation device 1206 is an operation device for the operator to operate the lens apparatus 100 (image pickup apparatus).

<Second Information>

The second information here includes information about the effects of the driving control of the focus lens unit 101 on recording by a camera main body 200. In the present exemplary embodiment, the driving of the focus lens unit 101 can be controlled by taking into account the effects of the control on the recording, based on such second information in addition to or instead of the second information according to the first exemplary embodiment. The second information can include information that is obtained by a control unit 211 analyzing image data obtained by a signal processing circuit 203. The second information can be determined based on information transmitted from the control unit 211 to the determination unit 1122 via a communication unit 212, a communication unit 126, and the driving control unit 1125. For example, the second information can be information about at least one of the following: the permissible circle of confusion, the defocus amount of the object obtained by imaging by the camera main body 200, and a sound level (level of recorded ambient sound) obtained by a microphone included in the camera main body 200. The determination unit 1122 can obtain information about the depth of focus from information about an f-number and the permissible circle of confusion.

<Machine Learning Model>

Figure 12:
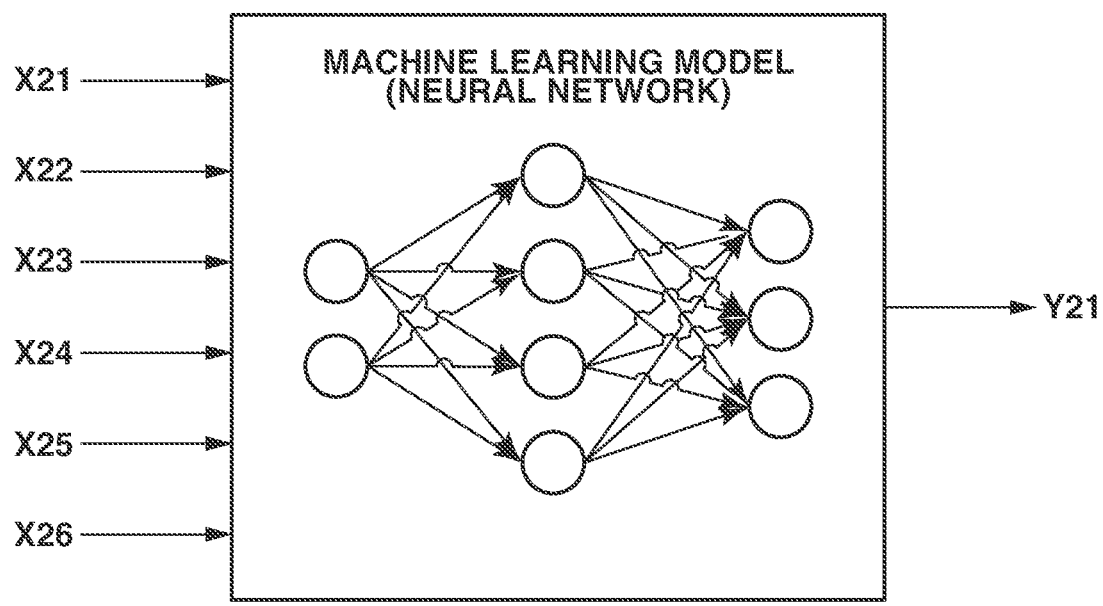
FIG. 12 is a diagram illustrating inputs and an output of a neural network.

A machine learning model in the AI control unit 1121 will now be described. FIG. 12 is a diagram illustrating inputs and an output of an NN. In the NN according to the second exemplary embodiment illustrated in FIG. 12, an input X21 is information about a driving instruction output from the driving control unit 1125. An input X22 is information about the position of the focus lens unit 101 obtained from a detector 106. An input X23 is information about the depth of focus obtained as the second information as describe above. An input X24 is information about the focus sensitivity serving as the second information. An input X25 is information about the defocus amount of the object obtained as the second information as described above. An input X26 is information about the sound level obtained as the second information as described above. An output Y21 is information about an output related to a control signal for the driving device 105. In such a manner, the output Y21 of the trained machine learning model is generated based on the inputs X21 to X26. The AI control unit 1121 generates the output Y21 as a control signal or generates a control signal based on the output Y21, and controls the driving device 105 by using the control signal.

<Log Information>

Log information according to the second exemplary embodiment will be described. A log storage unit 1124 collects and stores input/output information about the machine learning model, such as the inputs X21 to X26 and the output Y21 illustrated in FIG. 12, in each operation period of the machine learning model. The log storage unit 1124 stores information about the power consumption of the driving device 105 obtained by a processor 120 as the log information. The log storage unit 1124 also stores information about the driving instruction input to the AI control unit 1121 and the position of the focus lens unit 101 detected by the detector 106 as the log information. The log storage unit 1124 also stores information about the target position and the positioning accuracy of the focus lens unit 101 obtained by the processor 120 as the log information. The log storage unit 1124 also stores information about the driving speed and the driving acceleration of the focus lens unit 101 obtained from the information about the position of the focus lens unit 101 as the log information. The log storage unit 1124 also stores information indicating a relationship between at least one of the driving speed and driving acceleration and a driving noise level, and stores information about the driving noise level generated based on information about the at least one of the driving speed and driving acceleration and the information indicating the relationship. The log storage unit 1124 also obtains a ratio of a recording sound level to the driving noise level (signal-to-noise (S/N) ratio with the driving noise as the noise), and stores information about the ratio. The S/N ratio indicates the effect of the driving noise on recording. The higher the S/N ratio, the smaller the effect of the driving noise on recording. The log storage unit 1124 stores the stored log information into the log storage unit 1222 via the driving control unit 1125.

<Reward Information and Evaluation of Driving Performance>

Reward information according to the second exemplary embodiment will be described with reference to FIGS. 13A1 to 13B2. FIGS. 13A1 to 13B2 are diagrams illustrating the reward information. FIGS. 13A1 and 13B1 illustrate a relationship between time and a reward in training the machine learning model with respect to the defocus amount and the S/N ratio serving as driving performance, respectively. The horizontal axes of the graphs of FIGS. 13A1 and 13B1 represent time. FIGS. 13A2 and 13B2 illustrate a data structure of reward information with respect to the defocus amount and the S/N ratio, respectively. Similar to the data structure in the first exemplary embodiment, the data structure includes data on boundary values and data on rewards in respective ranges defined by the boundary values with respect to each type of driving performance.

The vertical axis of FIG. 13A1 indicates the value of a defocus amount D. The defocus amount D has a positive value if the focal point is off to the infinity side and a negative value if the focal point is off to the closest distance side. FIG. 13A2 illustrates reward information RD about the defocus amount D. The reward information RD includes a boundary value D1 and a boundary value D2 of the defocus amount D, and a reward SD1, a reward SD2, and a reward SD3 obtainable in respective ranges. A range where the defocus amount D is D1×−1 to D1 will be referred to as a range AD1. A range obtained by excluding the range AD1 from a range of D2×−1 to D2 will be referred to as a range AD2. A range obtained by excluding the ranges AD1 and AD2 from the entire range will be referred to as a range AD3. As illustrated in FIG. 13A2, the ranges AD1, AD2, and AD3 are assigned the rewards SD1, SD2, and SD3, respectively. The relationship in magnitude between the rewards is the reward SD1>the reward SD2>the reward SD3. The closer to 0 the defocus amount D is, the higher reward is assigned. As illustrated in FIG. 13A1, defocus amounts D at times Tp1, Tp2, and Tp3 belong to the ranges AD2, AD3, and AD1, respectively. Thus, the rewards obtainable at the times Tp1, Tp2, and Tp3 are the rewards SD2, SD3, and SD1, respectively. Here, the boundary value D1 can have a value of $F\delta/2$, and the boundary value D2 can have a value of $F\delta$, for example. In other words, the highest reward SD1 is obtained if the defocus amount D has a value less than or equal to one half of the depth of focus ($|D| \leq F\delta/2$). If the defocus amount D has a value greater than one half of the depth of focus and up to the depth of focus ($F\delta/2 < |D| \leq F\delta$), the intermediate reward SD2 is obtained. If the defocus amount D has a value exceeding the depth of focus ($|D| > F\delta$), the lowest reward SD3 is obtained.

The vertical axis of FIG. 13B1 indicates the value of an S/N ratio N. The higher the S/N ratio N, the smaller the effect of the driving noise on recording quality. FIG. 13B2 illustrates reward information RN about the S/N ratio. The reward information RN includes a boundary value N1 and a boundary value N2 of the S/N ratio, and a reward SN1, a reward SN2, and a reward SN3 obtainable in respective ranges. A range where the S/N ratio is 0 to N1 will be referred to as a range AN1. A range of N1 to N2 will be referred to as a range AN2. A range obtained by excluding the ranges AN1 and AN2 from the entire range will be referred to as a range AN3. As illustrated in FIG. 13B2, the ranges AN1, AN2, and AN3 are assigned the rewards SN1, SN2, and SN3, respectively. The relationship in magnitude between the rewards is the reward SN1<the reward SN2<the reward SN3. The closer to 0 the S/N ratio N is, the lower reward is assigned. As illustrated in FIG. 13B1, S/N ratios N at times Tp1, Tp2, and Tp3 belong to the ranges AN1, AN3, and AN2, respectively. Thus, the rewards obtainable at the times Tp1, Tp2, and Tp3 are the rewards SN1, SN3, and SN2, respectively. Since the rewards are set so that the obtainable reward increases as the S/N ratio increases, a machine learning model beneficial in terms of recording quality can be generated.

The reward information for evaluating the defocus amount serving as the driving performance and the S/N ratio related to driving noise can be set as described above. Using such reward information, the machine learning unit 1221 can generate rewards for the respective types of driving performance in each unit time based on the log information in driving the focus lens unit 101, and accumulate the rewards to evaluate the machine learning model. Being based on the rewards related to a plurality of types of driving performance is beneficial in customizing the machine learning model. The boundary values are not limited to constant ones and can be changed as appropriate. The rewards are not limited to ones determined based on the boundary values, and may be determined based on functions related to the respective types of driving performance. In such a case, the reward information can include information about the functions.

<First Reward Section and Second Reward Section>

Next, information about a first reward section and information about a second reward section according to the present exemplary embodiment will be described. FIG. 14 is a diagram illustrating a data structure of the reward information. The information about the first reward section includes information about a reward RDb related to the defocus amount and a reward RNb related to the S/N ratio. The information about the second reward section includes information about a reward RDu related to the defocus amount and a reward RNu related to the S/N ratio. The rewards RDb and RDu have a data structure similar to that of the reward information RD about the defocus amount illustrated in FIG. 13A2. The rewards RNb and RNu have a data structure similar to that of the reward information RN about the S/N ratio illustrated in FIG. 13B2.

The information about the first reward section is information about rewards specific to the lens apparatus 100. The information about the first reward section is stored in the first reward section storage unit 1224 in advance as reward information specific to the lens apparatus 100. The information about the second reward section is information about rewards variable based on a request from the operator of the lens apparatus 100. The information about the second reward section is stored in the second reward section storage unit 1225 based on the operator's request. The reward storage unit 1223 stores the information about the first reward section and the information about the second reward section.

The information about the first reward section is reward information for obtaining allowable driving performance of the lens apparatus 100, and thus includes wider ranges of reward settings including negative values than the information about the second reward section does. The information about the second reward section is variable based on the operator's request, and can be obtained based on information about the request and information about options for the second reward section. The reward information is obtained from the information about the first reward section and the information about the second reward section. A machine learning model is trained (generated) by obtaining the evaluation value of the machine learning model based on the reward information as described with reference to FIGS. 13A1 to 13B2.

A method for obtaining the information about the second reward section based on the operator's request will now be described. FIGS. 15A and 15B are diagrams illustrating a data structure of the information about the options for the second reward section. FIG. 15A illustrates a data structure of information about an option URDu for the second reward section related to the defocus amount. The information about the option URDu includes boundary values of the defocus amount and reward information about respective ranges defined by the boundary values at each level. FIG. 15B illustrates a data structure of information about an option URNu for the second reward section related to the quietness (S/N ratio). The information about the option URNu includes boundary values of the S/N ratio and reward information about respective ranges defined by the boundary values at each level.

In both the information about the option URDu for the second reward section related to the defocus amount and the information about the option URNu for the second reward section related to the quietness (S/N ratio), the boundary values and the reward values are set so that the operator's request level decreases in order (ascending order) of levels 1, 2, and 3. More specifically, for example, the boundary values at level 1 are close to the target value of the driving performance and the reward values are high, compared to those at the other levels.

The operator's request can be input via the operation device 1206 illustrated in FIG. 11. Based on the request, the level of each type of driving performance can be selected from levels 1 to 3. Information about the level is transmitted to the second reward section storage unit 1225 via the driving control unit 1125. The second reward section storage unit 1225 identifies (selects) information about the second reward section related to each type of driving performance based on the information about the level of each type of driving performance. Thus, a customized machine learning model (weights) can be generated by training the machine learning model (weights) based on the customized information about the rewards. The information about the generated machine learning model (weights) is transmitted from the machine learning unit 1221, stored in the storage unit 123, and used to control the driving (driving device 105) of the focus lens unit 101.

Other Examples of Object to be Controlled

While the driving control is described to be targeted for the focus lens unit 101, the present exemplary embodiment is not limited thereto. In the present exemplary embodiment, the driving control may be targeted for other optical members such as a zoom lens unit, an image stabilization lens unit, a flange back adjustment lens unit, and an aperture stop. A defocus amount and quietness (S/N ratio) are the driving performance also to be taken into account in driving such optical members. If such other optical members are subjected to the driving control, information about other types of driving performance may be taken into account as the second information in addition to or instead of the defocus amount.

As described above, in the present exemplary embodiment, for example, a lens apparatus or an image pickup apparatus beneficial in terms of adaptation (customization) of the driving performance can be provided.

Third Exemplary Embodiment

«Configuration Example Where Remote Apparatus (Processing Apparatus) Includes Training Unit (Generator)»

Figure 16:
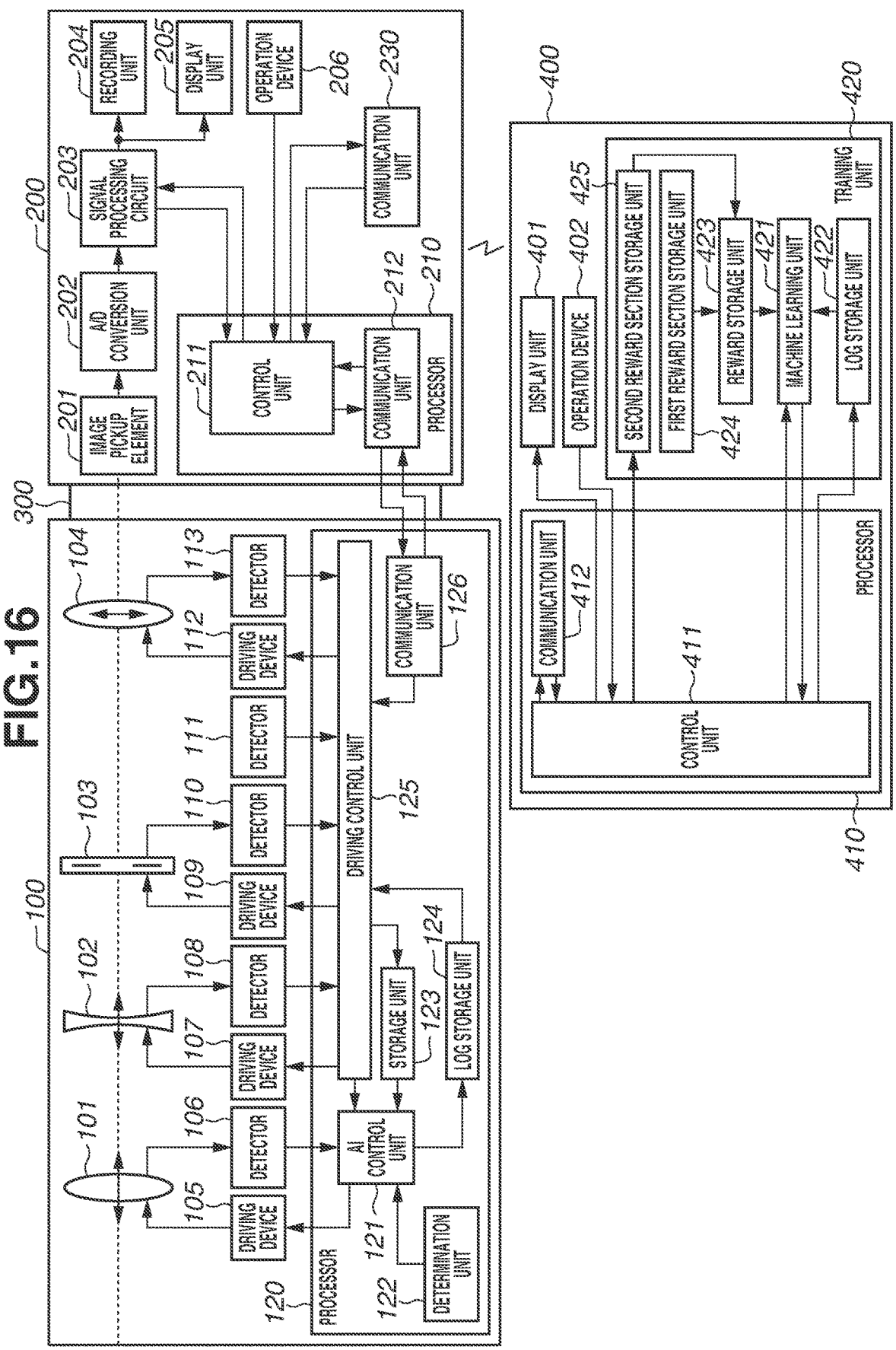
FIG. 16 is a diagram illustrating a configuration example of a lens apparatus according to a third exemplary embodiment.

A third exemplary embodiment will be described with reference to FIG. 16. FIG. 16 is a diagram illustrating a configuration example of a lens apparatus according to the third exemplary embodiment, and by extension, is a diagram illustrating a configuration example of a system (image pickup apparatus) including a configuration example of a camera main body as well. The system is different from that of the first exemplary embodiment in that a remote apparatus 400 is included and the remote apparatus 400 includes a training unit. A camera main body 200 includes a communication unit 230 for communicating with the remote apparatus 400. The remote apparatus 400 can be a processing apparatus such as a mobile terminal or a computer terminal, for example. The remote apparatus 400 includes a display unit 401, an operation device 402, a processor 410, and a training unit 420. The processor 410 includes a control unit 411 and a communication unit 412. The communication unit 412 is used to communicate with the camera main body 200. The communication unit 412 and the communication unit 230 of the camera main body 200 communicate wirelessly although the communication method is not limited to wireless communication. The wireless communication can be known wireless communication over a wireless local area network (LAN).

The training unit 420 can include a processor (such as a CPU or a GPU) and a storage device (such as a ROM, RAM, or HDD). The training unit 420 can include a machine learning unit 421, a log storage unit 422, a reward storage unit 423, a first reward section storage unit 424, and a second reward section storage unit 425. The training unit 420 also stores a program for controlling operation of these units. The training unit 420 can make an operation similar to that of the training unit 220 according to the first exemplary embodiment.

In the present exemplary embodiment, unlike the first exemplary embodiment, the training unit is not included in the camera main body 200 but in the remote apparatus 400. Thus, information transmission between a processor 210 of the camera main body 200 and the training unit 420 is performed via the communication unit 230, the communication unit 412, and the control unit 411. Image data output from a signal processing circuit 203 is transmitted to the control unit 411 via a control unit 211, the communication unit 230, and the communication unit 412. The image data transmitted to the control unit 411 is displayed on the display unit 401.

The control unit 411 can transmit an instruction related to execution of machine learning to the machine learning unit 421 based on the operator's operation on the operation device 402. The control unit 211 can transmit an instruction related to the execution of machine learning to the machine learning unit 421 via the control unit 411 based on the operator's operation on an operation device 206. Receiving the instruction, the machine learning unit 421 starts machine learning. Similarly, information about the level of the second reward section related to each type of driving performance, input by the operator from the operation device 402 or the operation device 206, is transmitted to the second reward section storage unit 425 via the control unit 411. The second reward section storage unit 425 identifies (selects) information about the second reward section related to each type of driving performance based on the information about the level of each type of driving performance. Thus, a customized machine learning model (weights) can be generated by training the machine learning model (weights) based on the customized information about the rewards. The information about the generated machine learning model (weights) is transmitted from the remote apparatus 400 to the lens apparatus 100, stored in a storage unit 123, and used to control the driving (driving device 105) of a focus lens unit 101.

In such a manner, a customized machine learning model can be generated at a remote location away from the lens apparatus 100 in a state where an image obtained by the camera main body 200 can be observed (watched). The camera main body 200 may issue an instruction for executing machine learning and an instruction for setting the second reward section via the operation device 206 while the remote apparatus 400 performs only the machine learning processing that requires high-speed calculation processing.

As described above, in the present exemplary embodiment, for example, a lens apparatus, an image pickup apparatus, or a processing apparatus beneficial in terms of adaptation (customization) of driving performance can be provided.

In the first and third exemplary embodiments, the second information about the lens apparatus 100 to be used to train the machine learning model is described to be only information specific to the lens apparatus 100. In the second exemplary embodiment, the second information is described to include both the information specific to the lens apparatus 100 and information specific to the camera main body 200. However, this is not restrictive. The second information may include only the information specific to the camera main body 200.

Exemplary Embodiments Related to Program, Storage Medium, and Data Structure

An exemplary embodiment of the disclosure can be implemented by supplying a program or data (structure) for implementing one or more functions or methods of the foregoing exemplary embodiments to a system or an apparatus via a network or a storage medium. In such a case, a computer in the system or the apparatus can read the program or the data (structure) and perform processing based on the program or the data (structure). The computer can include one or a plurality of processors or circuits, and can include a network including a plurality of separate computers or a plurality of separate processors or circuits, to read and execute computer-executable instructions.

The processor(s) or circuit(s) can include a CPU, a microprocessing unit (MPU), a GPU, an application specific integrated circuit (ASIC), or a field programmable gate array (FPGA). The processor(s) or circuit(s) can also include a digital signal processor (DSP), a data flow processor (DFP), or a neural processing unit (NPU).

While the exemplary embodiments of the disclosure have been described above, it will be understood that the disclosure is not limited to the exemplary embodiments, and various modifications and changes may be made without departing from the gist thereof.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-033351, filed Feb. 28, 2020, which is hereby incorporated by reference herein in its entirety.

What is claimed is:

1. A lens apparatus comprising:
an optical member;
a driving device including a motor and configured to perform driving of the optical member;
a detector configured to detect a state related to the driving; and
a processor configured to generate a control signal for the driving device based on first information about the detected state, the processor including a machine learning model configured to generate an output related to the control signal based on the first information and second information about a state of the lens apparatus related to driving performance of the driving device;
an operation device for an operator to input information about a requirement for the driving performance of the driving device, and
a generator including a processing unit and configured to obtain information about a reward for evaluating the machine learning model based on the information about the requirement, and perform generation of the machine learning model based on the first and second information and the information about the reward, the evaluating being used to employ the machine learning model,
wherein the generator is configured to make an evaluation of the machine learning model based on the information about the reward, and is configured not to employ the machine learning model that satisfies an end condition and of which the evaluation does not satisfy an acceptance condition.

2. The lens apparatus according to claim 1, wherein the input information about the requirement relates to each of a plurality of types of the driving performance.

3. The lens apparatus according to claim 1, wherein the generator includes previously-prepared information about a first reward, and is configured to perform the generation of the machine learning model based on the information about the first reward and information about a second reward, the information about the second reward being obtained based on the input information about the requirement.

4. The lens apparatus according to claim 1,
wherein the generator is configured to obtain the information about the reward based on the second information.

5. The lens apparatus according to claim 4,
wherein the optical member is a lens unit configured to change an object distance, and
wherein the second information includes information about at least one of a depth of focus of the lens apparatus, an amount of movement of a focal point of the lens apparatus per a unit amount of movement of the lens unit, and sound around the lens apparatus.

6. The lens apparatus according to claim 1, wherein the generator is configured to obtain the information about the reward based on information from an image pickup apparatus main body on which the lens apparatus is mounted.

7. The lens apparatus according to claim 6, wherein the information from the image pickup apparatus main body includes information about at least one of a diameter of a permissible circle of confusion, a defocus amount, and a sound level.

8. The lens apparatus according to claim 6, wherein the processor is configured to generate the control signal based on the information from the image pickup apparatus main body.

9. The lens apparatus according to claim 1, wherein the generator is configured to employ the machine learning model of which the evaluation satisfies the acceptance condition.

10. An image pickup apparatus comprising:
the lens apparatus according to claim 1; and
an image pickup element including an image sensor and configured to pick up an image formed by the lens apparatus.

11. A processing apparatus configured to perform processing related to a machine learning model in a lens apparatus, the lens apparatus including an optical member, a driving device including a motor and configured to perform driving of the optical member, a detector configured to detect a state related to the driving, and a processor configured to generate a control signal for the driving device based on first information about the detected state, the processor including a machine learning model configured to generate an output related to the control signal based on the first information and second information about a state of the lens apparatus related to driving performance of the driving device, the processor being configured to output the first information and the second information to a generator including a processing unit and configured to perform generation of the machine learning model, the processing apparatus comprising:
an operation device for an operator to input information about a requirement for the driving performance of the driving device,
wherein the processing apparatus includes a processing unit and is configured to obtain information about a reward for evaluating the machine learning model based on the information about the requirement, the generator being configured to perform the generation of the machine learning model based on the first and second information and the information about the reward, the evaluating being used to employ the machine learning model, the generator being configured to make an evaluation of the machine learning model based on the information about the reward, and being configured not to employ the machine learning model that satisfies an end condition and of which the evaluation does not satisfy an acceptance condition.

12. The processing apparatus according to claim 11, further comprising the generator.

13. The processing apparatus according to claim 12, wherein the generator includes previously-prepared information about a first reward, and is configured to perform the generation of the machine learning model based on the information about the first reward and information about a second reward, the information about the second reward being obtained based on the input information about the requirement.

14. The processing apparatus according to claim 12, wherein the generator is configured to obtain the information about the reward based on the second information.

15. An image pickup apparatus main body on which a lens apparatus is mounted, the image pickup apparatus main body comprising the processing apparatus according to claim 11.

16. An image pickup apparatus main body on which a lens apparatus is mounted, the image pickup apparatus main body comprising the processing apparatus according to claim 12.

17. A processing method of performing processing related to a machine learning model in a lens apparatus, the lens apparatus including an optical member, a driving device including a motor and configured to perform driving of the optical member, a detector configured to detect a state related to the driving, and a processor configured to generate a control signal for the driving device based on first information about the detected state, the processor including a machine learning model configured to generate an output related to the control signal based on the first information and second information about a state of the lens apparatus related to driving performance of the driving device, the processor being configured to output the first information and the second information to a generator including a processing unit and configured to perform generation of the machine learning model, the processing method comprising:
  obtaining information about a reward for evaluating the machine learning model based on information about a requirement for the driving performance of the driving device, the information about the requirement being input from an operation device operated by an operator, the generator being configured to perform generation of the machine learning model based on the first and second information and the information about the reward, the evaluating being used to employ the machine learning model, the generator being configured to make an evaluation of the machine learning model based on the information about the reward, and being configured not to employ the machine learning model that satisfies an end condition and of which the evaluation does not satisfy an acceptance condition.

18. The processing method according to claim 17, further comprising generating the machine learning model by the generator based on the information about the reward.

19. A non-transitory computer-readable storage medium storing a program for causing a computer to perform a processing method for performing processing related to a machine learning model in a lens apparatus, the lens apparatus including an optical member, a driving device including a motor and configured to perform driving of the optical member, a detector configured to detect a state related to the driving, and a processor configured to generate a control signal for the driving device based on first information about the detected state, the processor including a machine learning model configured to generate an output related to the control signal based on the first information and second information about a state of the lens apparatus related to driving performance of the driving device, the processor being configured to output the first information and the second information to a generator including a processing unit and configured to perform generation of the machine learning model, the processing method comprising:
  obtaining information about a reward for evaluating the machine learning model based on information about a requirement for the driving performance of the driving device, the information about the requirement being input from an operation device operated by an operator, the generator being configured to perform generation of the machine learning model based on the first and second information and the information about the reward, the evaluating being used to employ the machine learning model, the generator being configured to make an evaluation of the machine learning model based on the information about the reward, and being configured not to employ the machine learning model that satisfies an end condition and of which the evaluation does not satisfy an acceptance condition.

\* \* \* \* \*